(12) United States Patent
Azizi et al.

(10) Patent No.: US 11,754,048 B2
(45) Date of Patent: Sep. 12, 2023

(54) TOWER ERECTION SYSTEM

(71) Applicant: NATIONAL OILWELL VARCO, L.P., Houston, TX (US)

(72) Inventors: Farzad Azizi, Sugarland, TX (US); Travis James Miller, Cypress, TX (US); Anthony Jason Harms, Hockley, TX (US); Robert Benjamin Donnally, Houston, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 117 days.

(21) Appl. No.: 17/212,578

(22) Filed: Mar. 25, 2021

(65) Prior Publication Data

US 2022/0307478 A1    Sep. 29, 2022

(51) Int. Cl.
*F03D 13/20* (2016.01)
*B66C 23/18* (2006.01)
*E04H 12/34* (2006.01)

(52) U.S. Cl.
CPC ............ *F03D 13/20* (2016.05); *B66C 23/185* (2013.01); *E04H 12/342* (2013.01)

(58) Field of Classification Search
CPC ..... F03D 13/20; B66C 23/185; B66C 23/207; E04H 12/342; F05B 2230/61
See application file for complete search history.

(56) References Cited

U.S. PATENT DOCUMENTS

| | | | |
|---|---|---|---|
| 3,250,415 A | 5/1966 | Wuesthoff | |
| 4,236,600 A | 12/1980 | Wooten | |
| 4,577,796 A | 3/1986 | Powers et al. | |
| 4,651,915 A | 3/1987 | Sprung | |
| 5,896,637 A | 4/1999 | Sarh | |
| 6,408,575 B1 | 6/2002 | Yoshida et al. | |
| 6,859,677 B2 | 2/2005 | Mitterholzer | |
| 7,934,585 B2 | 5/2011 | Iversen | |
| 8,042,249 B2 | 10/2011 | Kilibarda | |
| 8,534,958 B2 | 9/2013 | Bogl et al. | |
| 8,584,429 B2 * | 11/2013 | Zavitz | E04H 12/342 52/745.03 |
| 8,601,748 B2 | 12/2013 | Delago et al. | |

(Continued)

FOREIGN PATENT DOCUMENTS

| | | |
|---|---|---|
| CA | 2981225 A1 | 10/2016 |
| CN | 201701655 U | 1/2011 |

(Continued)

OTHER PUBLICATIONS

"U.S. Appl. No. 16/930,929, Non Final Office Action dated Jul. 16, 2021", 9 pgs.

(Continued)

*Primary Examiner* — Andrew J Triggs
(74) *Attorney, Agent, or Firm* — Schwegman Lundberg & Woessner, P.A.

(57) ABSTRACT

Tower erection systems and methods utilizing a load-sharing support member (LS support member) are disclosed. The LS support member can have a first end coupled to a crane tower and a second end configured to repeatably couple to the upper-most tower section of a partially assembled tower stack during assembly. During lifting, a portion of the vertical load is transferred to the partially assembled tower stack.

20 Claims, 32 Drawing Sheets

(56) References Cited

U.S. PATENT DOCUMENTS

| | | | |
|---|---|---|---|
| 9,238,923 B2* | 1/2016 | Arlaban Gabeiras | ........................ E04H 12/342 |
| 9,243,418 B2 | 1/2016 | Bogl et al. | |
| 9,284,165 B2 | 3/2016 | Willim | |
| 9,630,034 B2 | 4/2017 | Stewart | |
| 9,637,257 B2 | 5/2017 | Granger | |
| 9,657,495 B2 | 5/2017 | Lockwood | |
| 9,970,211 B2 | 5/2018 | Konduc et al. | |
| 10,023,443 B2* | 7/2018 | Herse | .................... B66C 23/185 |
| 10,287,794 B2 | 5/2019 | Neighbours | |
| 10,378,201 B2 | 8/2019 | Coombes | |
| 10,392,083 B2 | 8/2019 | Van Aalst | |
| 10,434,712 B1 | 10/2019 | Tran | |
| 10,487,806 B2 | 11/2019 | Huot et al. | |
| 10,633,880 B2 | 4/2020 | Murata | |
| 10,781,081 B2* | 9/2020 | Kersten | ................... B66C 13/16 |
| 2002/0129566 A1 | 9/2002 | Piccolo et al. | |
| 2009/0288913 A1 | 11/2009 | Nielsen | |
| 2012/0279141 A1 | 11/2012 | Wiederick et al. | |
| 2013/0026002 A1 | 1/2013 | Spangler | |
| 2013/0081337 A1* | 4/2013 | Zavitz | ................... E04H 12/344 52/745.17 |
| 2013/0223964 A1 | 8/2013 | Zheng et al. | |
| 2014/0102039 A1* | 4/2014 | Wagner | ................... F03D 80/50 52/745.18 |
| 2014/0202971 A1* | 7/2014 | Bosco | ................... B66C 23/185 212/270 |
| 2016/0010621 A1 | 1/2016 | Zuteck | |
| 2016/0237985 A1* | 8/2016 | Bögl | ..................... B66C 23/185 |
| 2017/0107736 A1 | 4/2017 | Lockwood | |
| 2017/0121998 A1 | 5/2017 | Carrillo Alonso et al. | |
| 2019/0093381 A1 | 3/2019 | Perez Garcia et al. | |
| 2019/0136569 A1 | 5/2019 | Lockwood | |
| 2019/0338757 A1 | 11/2019 | Helmens | |
| 2021/0207359 A1 | 7/2021 | Konduc | |
| 2021/0207393 A1 | 7/2021 | Konduc | |
| 2022/0307478 A1* | 9/2022 | Azizi | .................... B66C 23/207 |

FOREIGN PATENT DOCUMENTS

| | | |
|---|---|---|
| CN | 105692470 B | 6/2018 |
| DE | 19647515 A1 | 5/1998 |
| DE | 19741988 A1 | 4/1999 |
| DE | 202010008582 U1 | 2/2012 |
| EP | 0334187 A1 | 9/1989 |
| EP | 1284365 A2 | 2/2003 |
| EP | 2360373 A2 | 8/2011 |
| EP | 2715115 A1 | 4/2014 |
| JP | 2006-225158 A | 8/2006 |
| NL | 2016927 A | 12/2017 |
| RU | 2564328 C2 | 9/2015 |
| WO | WO-2008/099129 A3 | 12/2008 |
| WO | WO-2021/134123 A1 | 7/2021 |

OTHER PUBLICATIONS

"U.S. Appl. No. 16/930,929, Response filed Jun. 29, 2021 to Restriction Requirement dated May 28, 2021", 7 pgs.
"U.S. Appl. No. 16/930,929, Restriction Requirement dated May 28, 2021", 6 pgs.
"U.S. Appl. No. 16/993,422, Non Final Office Action dated Aug. 16, 2021", 16 pgs.
"International Application Serial No. PCT/CA2020/000052, International Search Report dated Jul. 9, 2020", 4 pgs.
"International Application Serial No. PCT/CA2020/000052, Written Opinion dated Jul. 9, 2020", 9 pgs.
"WindPACT Turbine Design Scaling Studies Technical Area 3?Self-Erecting Tower and Nacelle Feasibility", Subcontractor Report—NREL/SR-500-29493. Global Energy Concepts, LLC, (Mar. 2000-Mar. 2001), 72 pgs.
"U.S. Appl. No. 16/930,929, Response filed Oct. 18, 2021 to Non Final Office Action dated Jul. 16, 2021", 8 pgs.
"U.S. Appl. No. 16/930,929, Notice of Allowance dated Nov. 3, 2021", 8 pgs.
"U.S. Appl. No. 16/993,422, Response filed Nov. 16, 2021 to Non Final Office Action dated Aug. 16, 2021", 14 pgs.
"U.S. Appl. No. 16/993,422, Final Office Action dated Dec. 7, 2021", 17 pgs.

* cited by examiner

TOWER ERECTION SYSTEM

TECHNOLOGICAL FIELD

The present disclosure relates to systems and methods for handling, assembling or disassembling components of a tower, such as, e.g., a wind turbine tower composed of multiple sections and components.

BACKGROUND

Wind turbine towers are often constructed from multiple tower sections stacked on top of one another and extending upward from a tower foundation, with a wind turbine housed in a nacelle atop the tower and a set of turbine blades secured to the turbine. The tower sections are typically shipped separately to the tower site, where cranes may be used to lift the tower sections as well as the nacelle and blades as the tower is being assembled. Limitations in the capacity, mobility, wind rating and reach of cranes, however, can entail limits on the achievable height of the wind towers.

Current industrial wind turbine towers are often constructed from a few tower sections each measuring sixty to ninety feet in length, reaching a total height of a few hundred feet (e.g., about 130 to 140 meters). While it would be desirable to build higher towers with heights greater than, e.g., 160 meters or higher such as 200 meters or higher, to take advantage of the greater more consistent wind speed at those heights to generate more electricity, the unavailability of, or limited access to, cranes large enough and with enough capacity to accommodate desired tower heights can create difficulties or impasses in assembling (or disassembling) the wind turbine towers. Further, to the extent sufficiently large cranes are available, they are expensive to rent, and the potential for crane downtime, e.g., when wind speeds are too high for the crane to be used safely, further drives up cost. Accordingly, alternatives for erecting and servicing wind turbine towers are desirable.

SUMMARY

The following presents a simplified summary of one or more embodiments of the present disclosure in order to provide a basic understanding of such embodiments. This summary is not an extensive overview of all contemplated embodiments and is intended to neither identify key or critical elements of all embodiments, nor delineate the scope of any or all embodiments.

This disclosure pertains, in some aspects, to systems and methods for assembling a tower by load sharing with a portion of the wind tower already erected to circumvent the need for large cranes with high capacity. More particularly, it describes a tower erection system that utilizes a load sharing support member (referred to herein as "LS support member") configured to be coupled to the upper-most tower section of a partially assembled tower while lifting a subsequent tower section (or wind tower component) to be coupled to the partially assembled wind tower. The system generally includes the LS support member that has a first end coupled to a portion of the crane tower and a second end (e.g., a free end) that can be repeatedly coupled to the current upper-most tower section before lifting a subsequent tower section. As discussed herein, the LS support member can reduce the moment about the tower crane as a portion of the vertical load is transferred to the partially assembled wind tower via the LS support member. By transferring a portion of the lifting load to the partially assembled portion of the wind tower during lifting, the capacity of the overall lift can be increased without needing to increase the capacity of the tower crane.

Erecting a tower (e.g., wind tower) with this system generally involves using a mobile crane for initially installing one or more tower sections. The mobile crane can then be used to install the tower crane. In one example, the mobile crane can be used to couple the LS support member to the tower crane. Once the LS support member is coupled to the tower crane, the tower crane can be manipulated to position the free end of the LS support member adjacent to the upper-most tower section such that the upper-most tower section can be coupled to the LS support member, e.g., via tension cables. With the LS support member coupled to the upper-most tower section, the system can lift a subsequent tower section to be placed on top of the upper-most tower section coupled to the LS support member. After each new tower section is coupled to the assembled tower sections (e.g., tower stack), the tower crane height is increased, and the LS support member is coupled to the current upper-most tower section prior to lifting another tower section for coupling to the tower stack. Once the erection of the wind tower is achieved, the nacelle is lifted and attached to the tower. In one aspect, the LS support member is configured to be able to be used during the lifting of the tower sections as well as the lifting of the nacelle. Once the nacelle is lifted and attached to the tower, the LS support member can be uncoupled from the tower crane and the tower crane is used to lower the LS support member. The tower crane can be used to lift the remaining components of the wind tower. For example, the tower crane (without the LS support member) can be used to lift the hub and the blades.

To provide lateral stability during the assembly process, the system can further include horizontal supports that engage a lateral surface of the tower. For example, after lifting and assembling another tower section, the LS support member can be uncoupled from the previous upper-most tower section and moved vertically to be coupled to the current upper-most tower section. After the LS support member is uncoupled from a particular tower section, one or more horizontal supports can be coupled to the particular tower section and the mast of the tower crane to provide lateral stability during assembly.

In one aspect, the system can provide two LS support members. A first LS support member that can be used for lifting the tower sections. After the tower is assembled the first LS support member can be uncoupled from the tower crane and lowered. A second LS support member, having a greater capacity compared to the first LS support member, can be lifted by the tower crane and attached to the tower crane. The second LS support member can then be coupled to the upper-most tower section and the nacelle can be lifted. Once the nacelle is attached to the tower, the second LS support member can be uncoupled from the tower crane and the tower crane is used to lower the second LS support member. The tower crane can be used to lift the remaining components of the wind tower. For example, the tower crane (without the second LS support member) can be used to lift the hub and the blades.

Depending on the type of tower crane used, the LS support member can be configured differently. In one aspect where a mast type tower crane is used, the LS support member can extend from a first end to a second end. In on example, a cross-beam at the first end can be coupled to the boom of the crane. A plurality of columns can extend from the first end to a rim at the second end. The rim can include a plurality of stationary members and at least one moveable member. The moveable member can move between and open and closed position. As discussed herein, in the open configuration the LS support member can be removed from the crane. The moveable member allows the LS support member to be moved away from the crane without interfering with the tower stack.

In an example where the crane is a luffing-jib tower crane, the LS support member can include two moveable arms that extend laterally from the tower of the crane. A first end of the arm can be coupled to the tower and extend to a second end that can repeatably be coupled to a tower section. The two moveable arms are adjustable to be able to accommodate different widths of tower sections.

Beneficially, the towers assembled with the disclosed systems load share with the partially assembled tower stack such that the capacity of the crane tower does not limit the lift. The disclosed systems and methods thus facilitate erecting towers reaching heights of several hundreds of feet or even in excess of a thousand feet significantly taller than current industrial wind turbine towers. Additionally, current crawler cranes are limited to a wind limit of 9 meters/second (m/s) and can significantly limit the workable timeframe to install a wind tower. For example, wind towers are installed in locations that are considered high wind areas, and around, e.g., twenty days a month can have wind speeds greater than the wind limit. The present systems and methods can increase the wind limit. In one example, when lifting with the LS support member, the system can increase the wind limit to, but not limited to, 25 m/s. When lifting with the crane, because portions of the crane can be coupled to the partially assembled tower, the wind limit can be increased to, but not limited to, 18 m/s. The actual increase in wind limit can vary on a variety of factors and design of the crane.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure provides multiple embodiments of systems and methods for erecting a tower from the bottom up using a LS support member coupled to a tower crane to load-share the lifting of tower components (e.g., tower sections and nacelle) with a partially assembled tower. The systems and methods of the disclosure can accommodate tapered as well as straight walled cylindrical towers. As discussed herein, a portion of the lifting load of the tower crane is shared with the partially assembled tower, such that the moment about the tower crane is reduced. By transferring a portion of the vertical load to the partially assembled tower, the maximum load capacity rating of the tower crane is not limiting. That is, a tower crane can be used with the LS support system of the present disclosure to increase the overall maximum capacity of the lift and increase the wind limit of the tower. For example, by transferring a portion of the lifting load (e.g., vertical load) to the partially assembled tower, less of the overall capacity is used when lifting with the LS support member as compared to lifting without the LS support member. Since less of the overall capacity of the tower crane is used when lifting with the LS support member, the portion of the overall capacity not used for the lift can be used to increase the wind limit of the tower crane. Stated differently, the "freed-up" portion of the lifting capacity of the tower crane, gained by using the LS support member, can be utilized to increase the wind limit during lifting.

By doing so, the larger (higher capacity) tower cranes that are more expensive to rent and mobilize are not needed and the down time expense of the tower cranes due to increased wind speeds can be minimized. The wind towers contemplated can include land-based towers and off-shore wind towers. The LS support can be used with any assembly of a tower (e.g., a wind tower) having any height. In particular, the wind towers can have heights greater than 130 meters, e.g. greater than 160 meters such as greater than 200 meters or higher. As discussed herein, the LS support system and methods disclosed herein allow for crane towers to increase the overall maximum load capacity by load sharing with the partially assembled tower. Additionally, because the load is shared, wind speeds that would otherwise reduce the maximum load capacity of a tower crane resulting in down time can be minimized with the present tower erection system of the present disclosure utilizing the LS support member.

Figure 1:
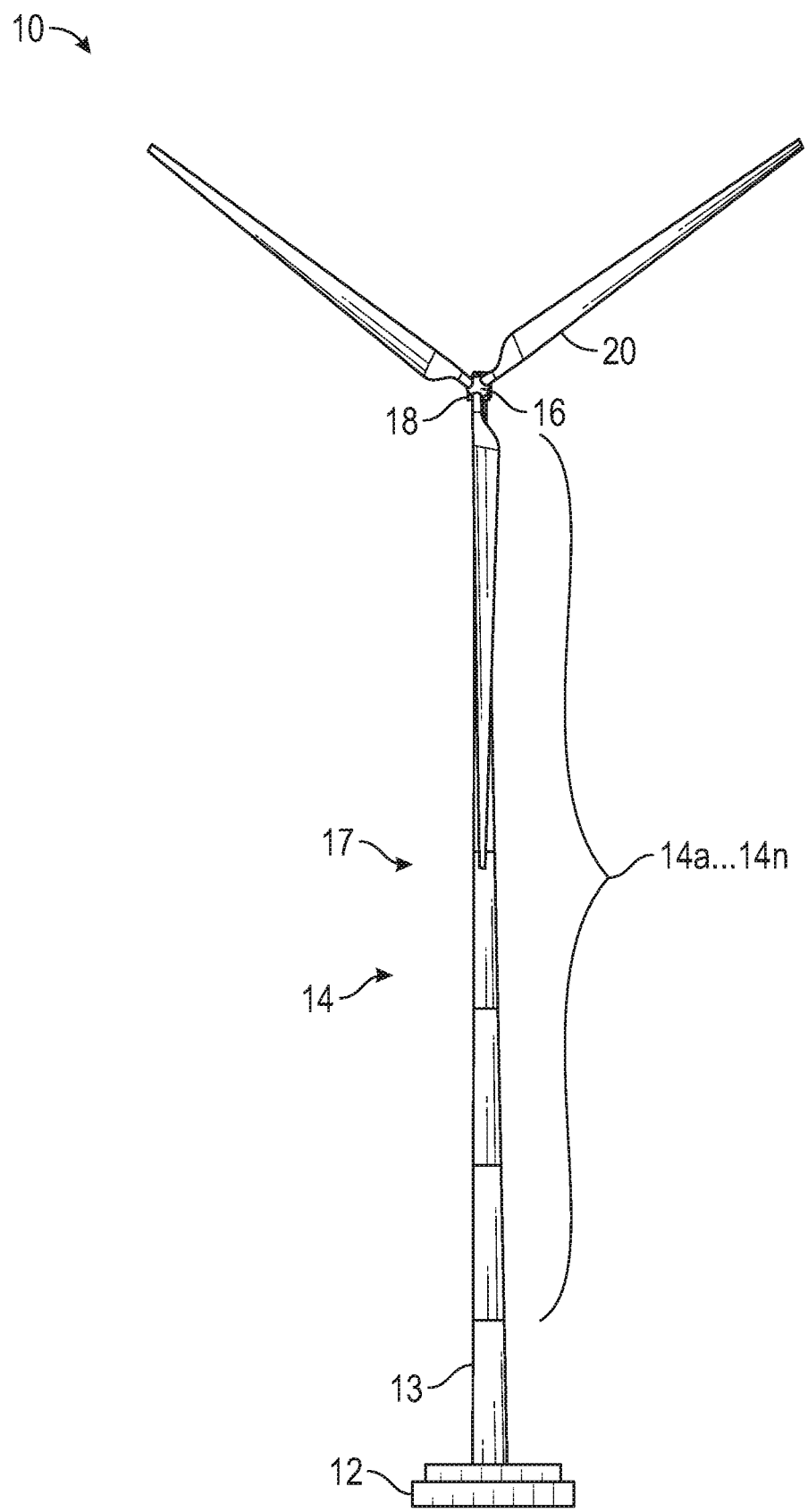
FIG. 1 is a side view of a completely assembled wind tower, according to one or more embodiments.

FIG. 1 is a front view of a completely assembled wind tower 10, according to one or more embodiments. The wind tower 10 can include a foundation 12, a tower 14 including a tower base 13 and a tower stack 17 including a plurality of tower sections 14a . . . n (referred to collectively as "tower sections 14"), a hub 16, a nacelle 18, and rotor blades 20. The tower base section 13 can be a bottom tower section, which is usually shorter than the tower sections 14 stacked there above. The tower base section 13 can be one section or can be a plurality of tower base sections 13.

Figure 2:
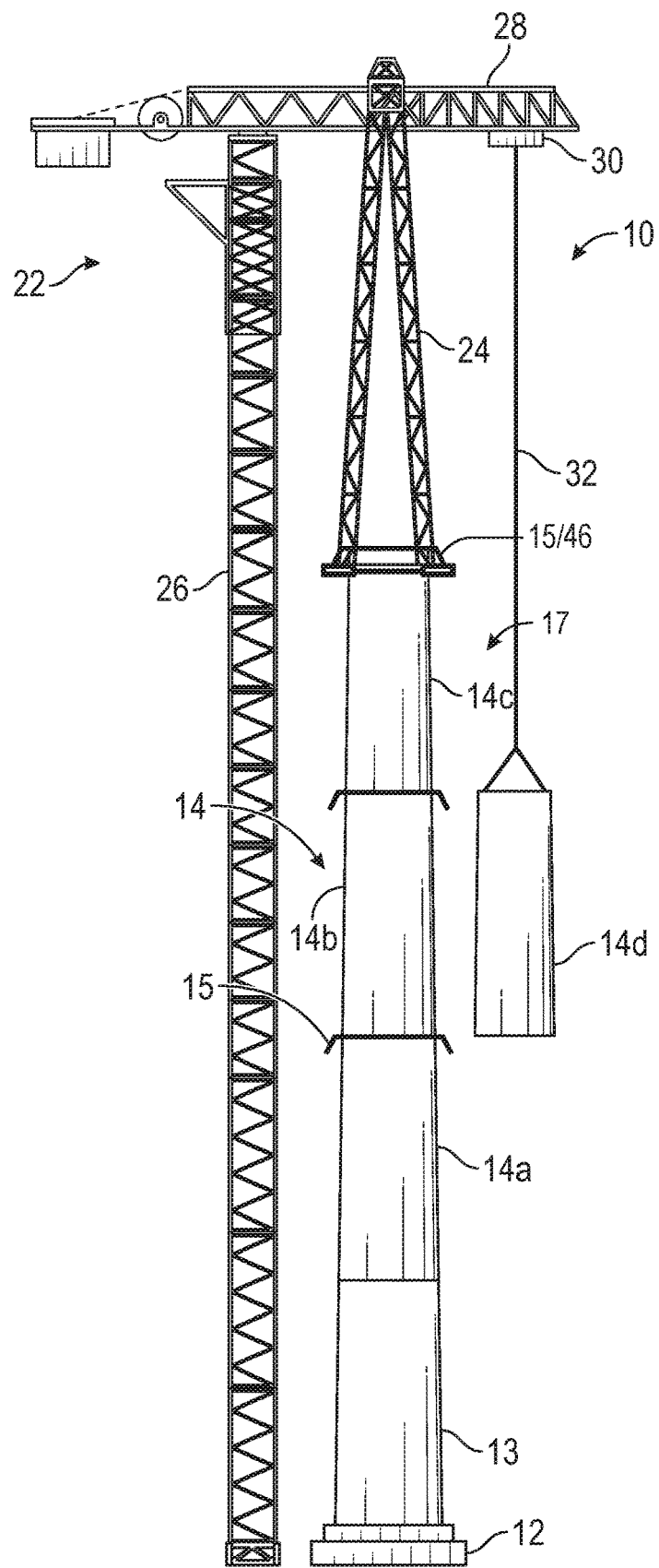
FIG. 2 is a side view of a partially assembled wind tower and a tower crane including the LS support, according to one or more embodiments.

FIG. 2 is a side view of a partially assembled wind tower 10 and a tower crane 22 (also referred to herein as "crane 22") including the LS support member 24 to assist lifting tower components. As shown in the example in FIG. 2, the crane 22 (such as a rotating self-climbing tower) is used to erect portions of the wind tower 10. However, the LS support member 24 can be used with other types of cranes. In one embodiment, the crane 22 has a crane tower 26, a boom 28, and a trolley 30, movable along the boom 28, used to hoist components such as the tower sections 14, the hub 16, the rotor blades 20, the nacelle 18, or also parts (not shown) of the tower 10 conventionally with load cable(s) 32. As discussed herein, each tower section 14 that is configured to utilize the LS support member 24 can include a hanger plate 15 that can be coupled to the LS support member 24 during lifting. The hanger plate 15 can also be used to couple to the crane tower 26 such as after the LS support member 24 has been removed to provide lateral support.

Figure 4:
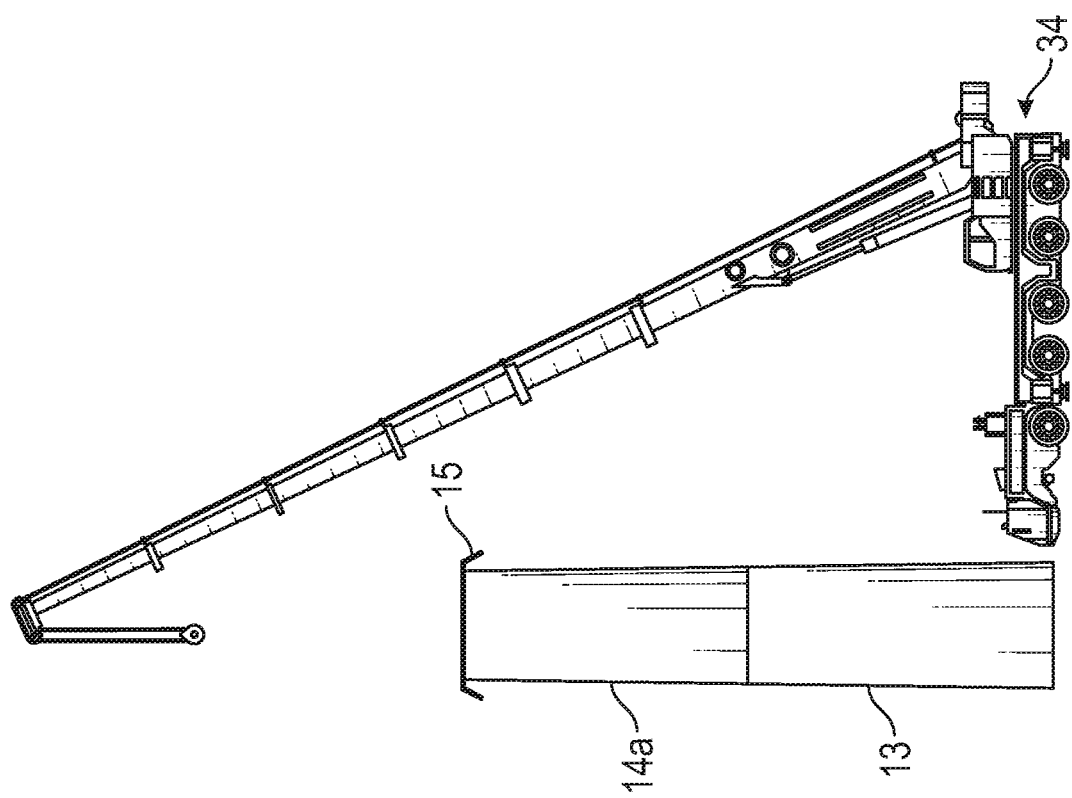
FIGS. 3-4 are a side view of a mobile crane assembling an initial portion of a wind tower, according to one or more embodiments
Figure 3:
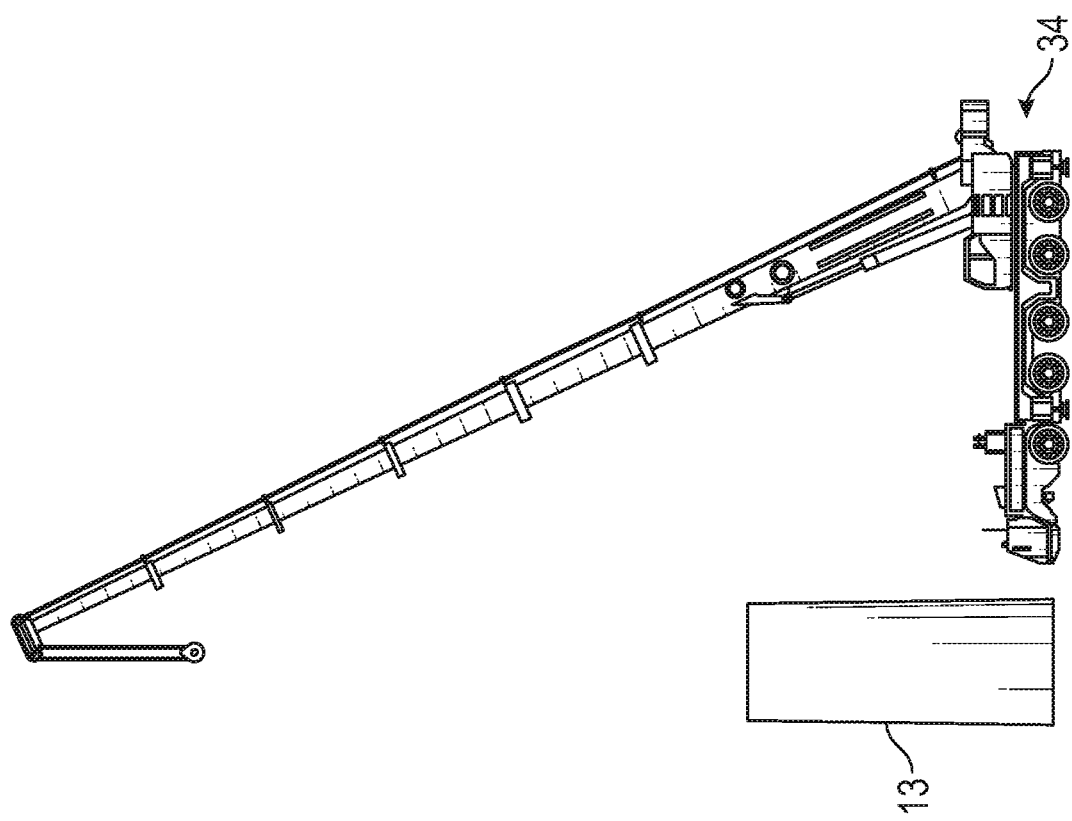

FIGS. 3-4 illustrate a side view of a mobile crane assembling an initial portion of a wind tower. FIG. 3 illustrates a mobile crane 34 erecting the tower base section 13 and FIG. 4 illustrates the mobile crane 34 erecting a first tower section 14a. Any mobile crane 34 can be used such as a truck-mounted or independently movable, lattice boom crane. While the mobile crane 34 is illustrated as erecting a single tower base section 13 and a single tower section 14a, the mobile crane 34 can be used to erect one or more tower base sections 13 and one or more tower sections 14 depending on the height and weight of the individual sections and the maximum height and safe lifting capacity of the mobile crane 34. Additionally, one or more tower base sections 13 and/or one or more tower sections 14 can be coupled together prior to lifting such that the mobile crane 34 can lift more than one section at a time. Mobile cranes are versatile and can move around at the construction sites once assembled. However, the lifting height and capacity of mobile cranes is limited. The present disclosure utilizes the mobile crane 34 to install the tower base section 13 (including one or more tower base sections 13) and one or more initial tower sections 14. The number of tower base sections 13 and tower sections 14 depends on the height of each tower section 14 and the lifting height and weight of the individual sections of the mobile crane 34. In one example, the mobile crane 34 is further used to assemble the tower crane 22 and couple the LS support member 24 to the boom 28 of the tower crane 22.

Figure 5:
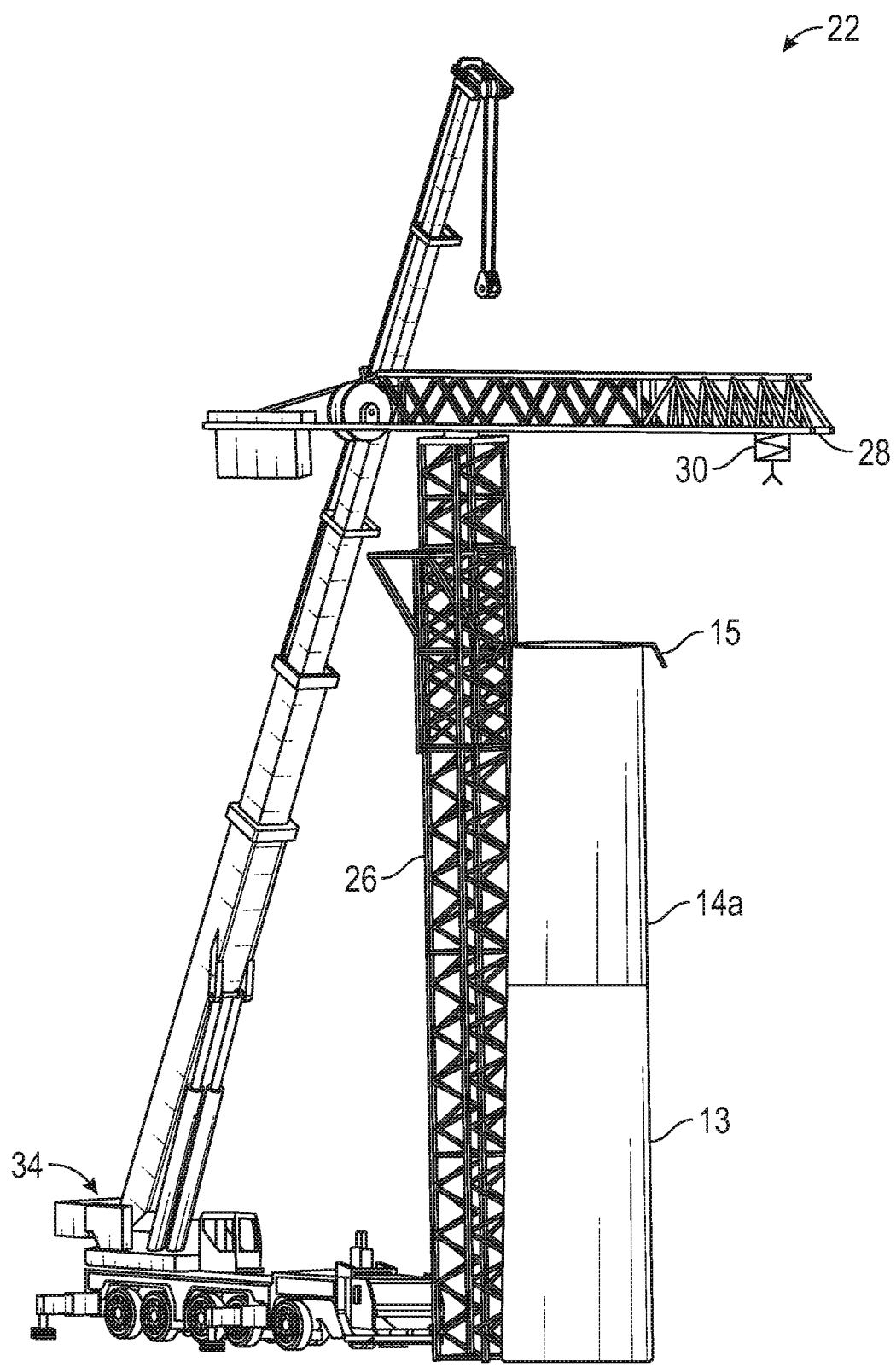
FIG. 5 is a perspective view of the mobile crane assembling a tower crane, according to one or more embodiments.
Figure 6:
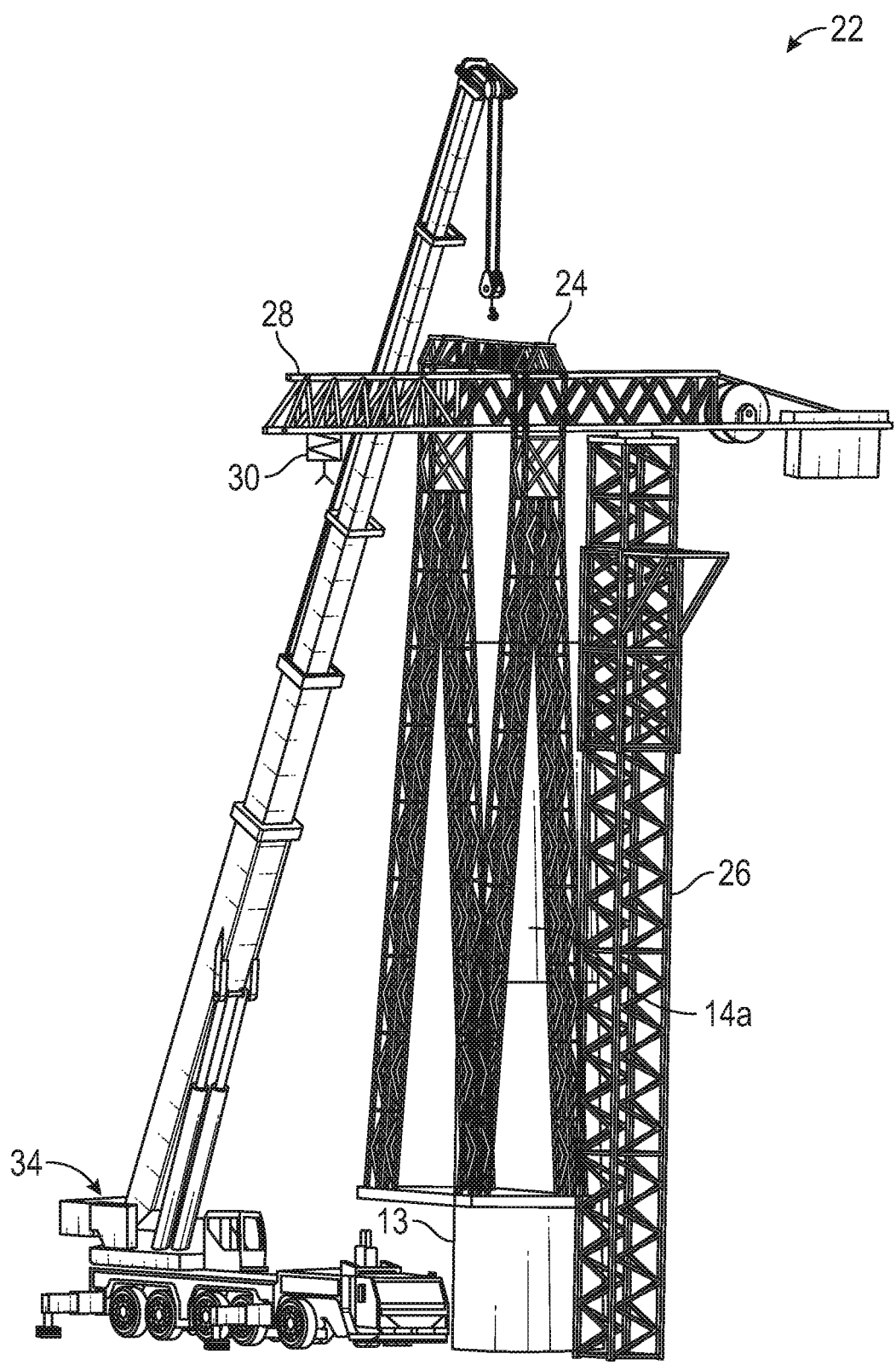
FIG. 6 is a perspective view of the mobile crane installing a LS support member to the tower crane assembled in FIG. 5, according to one or more embodiments.

FIG. 5 illustrates the mobile crane 34 being used to initially assemble the tower section 26, e.g., a self-climbing tower crane, of the tower crane 22, and FIG. 6 illustrates the mobile crane 34 installing the LS support member 24 onto the boom 28 of the tower crane 22. In one example, the tower crane 22 can arrive at the construction site and the mobile crane 34 can assemble the boom 28 and the machinery section and place these components on the tower section 26. The initial height of the crane tower 22 can be assembled by the mobile crane 34. However, the tower crane 22 can grow itself one crane section at a time to grow with the wind tower 10 during assembly. In one example, the mobile crane 34 can assemble three base crane sections that are each about 38 feet (11.6 meters) long. However, the number and length of the individual base crane sections can vary depending on the particular type and brand of tower crane 22.

As seen in FIG. 6, the mobile crane 34 is used to install the LS support member 24 onto the boom 28 of the tower crane 22. As discussed herein, there are many ways to removably couple the LS support member 24 to the boom 28 of the tower crane 22, however, the LS support member 24 should not interfere with the moveable trolley 30 that can move along the boom 28.

Figure 7:
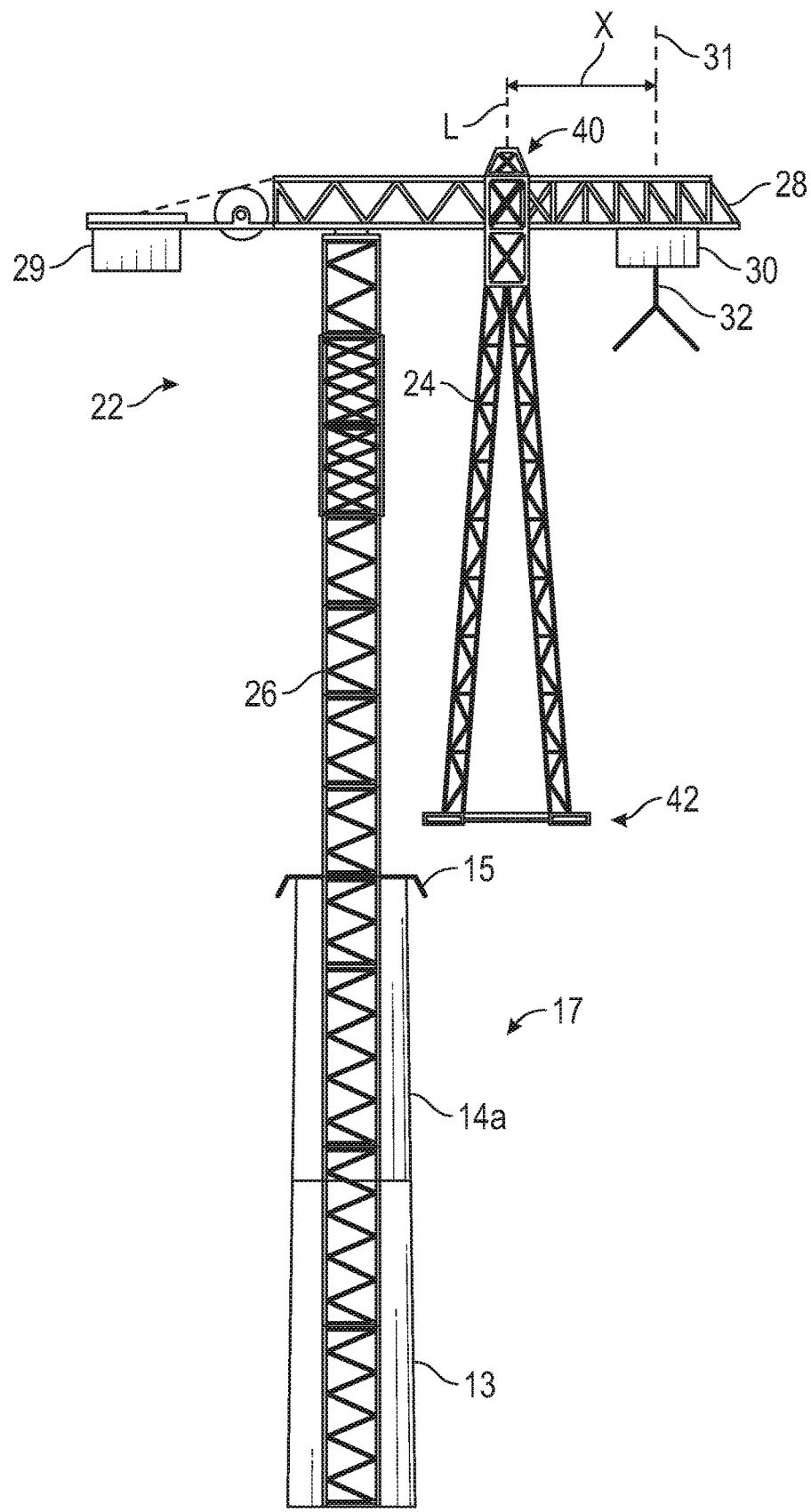
FIGS. 7-15 are side views of the LS support member in FIG. 6 during a sequence of steps during tower assembly, according to one or more embodiments.

FIGS. 7-15 illustrate the LS support member 24 being used to lift tower section 14b. As seen in FIG. 7, the tower crane 22 can include a counterweight 29 or anchor line (not shown) to counterbalance the weight of the lift. In one example, the LS support member 24 extends from a first end portion 40 to a second end portion 42. As discussed herein, a portion or the entire LS support member 24 can be configured to be removably coupled to the tower crane 22, e.g., along the boom 28. The location "L" of the LS support member 24 along the boom 28 can vary based on a variety of factors. The location "L" of the LS support member 24 can be defined as a center point of the LS support member 24. In one example, the location "L" of the LS support member 24 along the boom 28 can be about X meters from the furthest heavy lifting point 31. The furthest heavy lifting point 31 can be along a lifting axis at the furthest lifting point from the tower section 26 of the tower crane 22. The counterweight 29 or anchor line (not shown) can be about 2-3× meters away from the LS support member 24 location "L". In one non-limiting example, if the boom 28 is capable of lifting 15 meters (m) away from a tower 26 centerline, then the counterweight 29 or anchor line (not shown) can be attached 30 to 45 m away from the LS support member 24 location "L".

Figure 8:
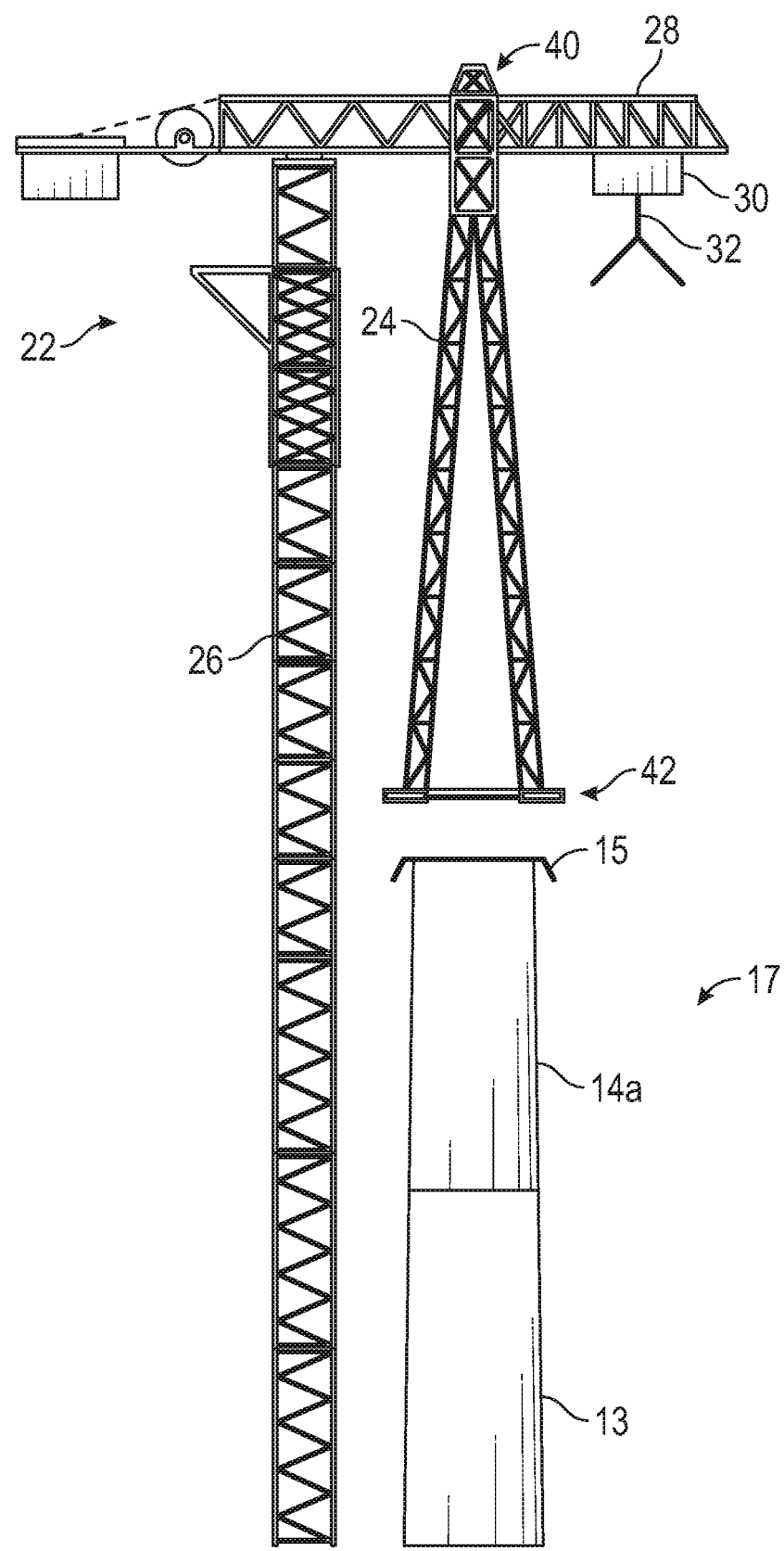
Figure 9:
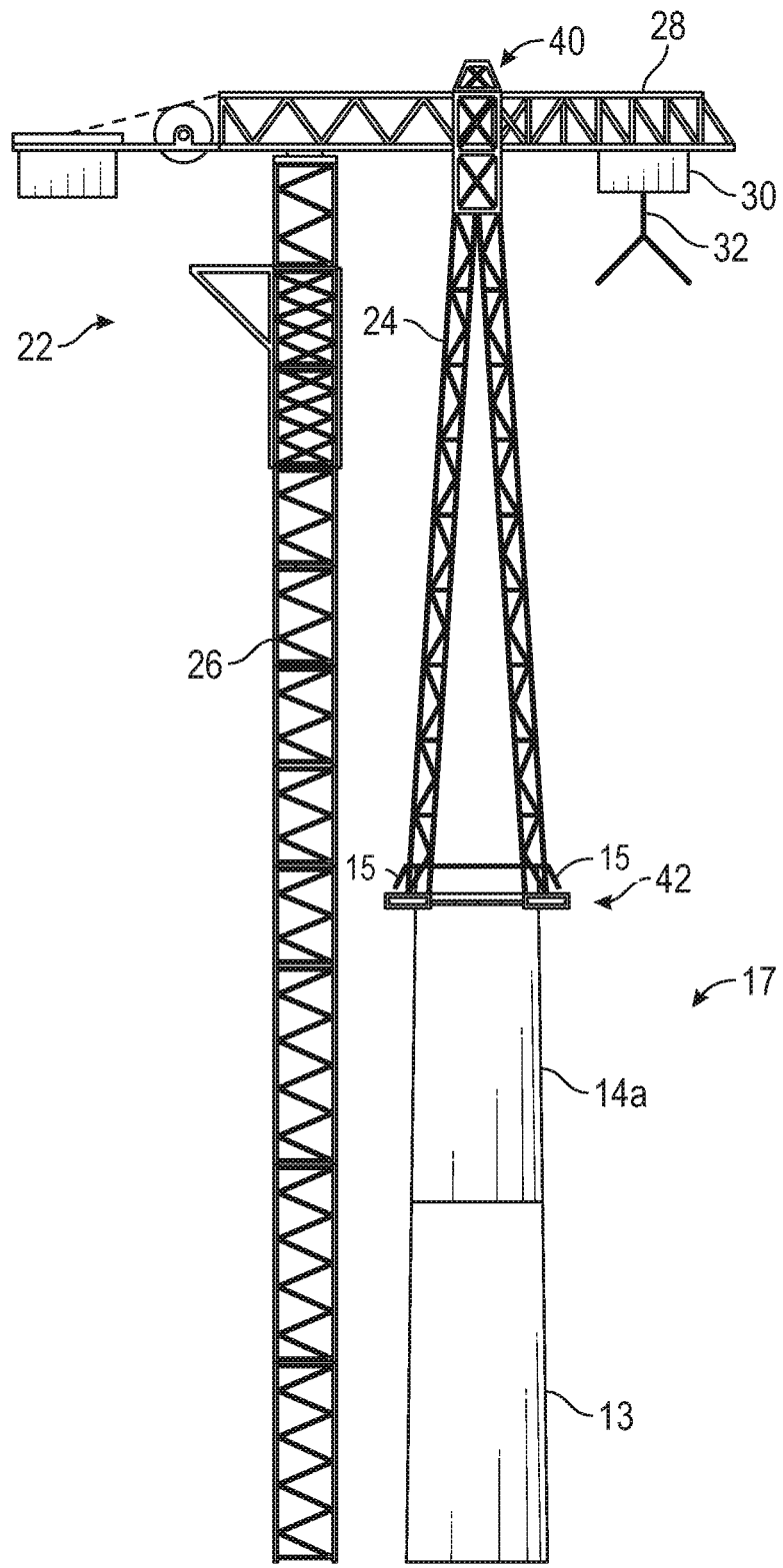

The second end portion 42 is configured to be coupled to the upper-most tower section 14 of a partially assembled tower 10, which in this case is tower section 14a. After assembly of the tower crane 22 and the installation of the LS support member 24 onto the boom 28, the tower crane 22 can self-climb to a height such that the second end portion 42 clears (e.g., is higher than) the upper-most tower section 14a, as shown in FIG. 7. The tower crane 22 can self-climb by adding additional tower crane sections to the tower crane 26. In one example, each tower crane section can be 19 feet (5.8 meters) long. Once the tower crane 22 self-climbs to a sufficient height, the boom 28 can rotate about the crane tower 26 to position the second end portion 42 of the LS support member 24 above and adjacent to the upper-most tower section 14a, as shown in FIG. 8. Once in position, the tower crane 22 can be lowered, e.g., by removing one tower crane section, to lower the LS support member 24 onto the upper-most tower section 14a of the tower stack 17, as shown in FIG. 9.

As discussed herein, the LS support member 24 can include a moveable member 54 (see FIG. 22) that can be opened and closed. In one example, instead of needed the tower crane 22 to climb to a height such that the second end portion 42 clears the upper-most tower section 14a and then the crane gets lowered over the upper-most tower section 14a, the moveable member 54 of LS support member 24 can be opened and moved along the boom 28 to position the LS support member 24 around the upper-most tower section 14a.

As discussed herein, the tower sections 14 can include a hanger plate 15 (see FIG. 27) that can be used to couple the LS support member 24 to a tower section 14 of the tower stack 17. In one example, the hanger plate 15 can include four coupling locations that correspond to four coupling locations of the LS support member 24 along the second end portion 42. The coupling locations of the LS support member 24 and of the hanger plate 15 can be coupled via tension members 46. The number of coupling locations and tensions members 46 used can vary depending on a variety of factors. More or less than four coupling locations and four tensions members 46 can be used.

In one example, the tension members 46 can see two times the lifting load and depending on the number of tension members and tower connections dictates the size, number, and material requirements. In an example assuming even load distribution on the wind tower, fewer connections increase the size and tensile capacity required for each tension member 46. In one example, the tension members 46 can be mechanical systems, e.g. hydraulically actuated steel linkages connecting the LS support member 24 to wind tower 10. Additional connections would reduce the size and tensile capacity requirement of each tension member. In certain instances, the tension members 46 could potentially be installed manually using shackles and steel wire rope tension members.

Various mechanisms can be used to couple the LS support member 24 to the boom 28. For example, cross-beams, ball and socket connections, among others can be used. However, the connection between the LS support member 24 and the boom 28 should be such that the LS support member 24 can be removable coupled and such that a portion of the vertical load during lifting is transferred from the boom 28 to the partially assembled tower 10 via the LS support member 24.

Figure 10:
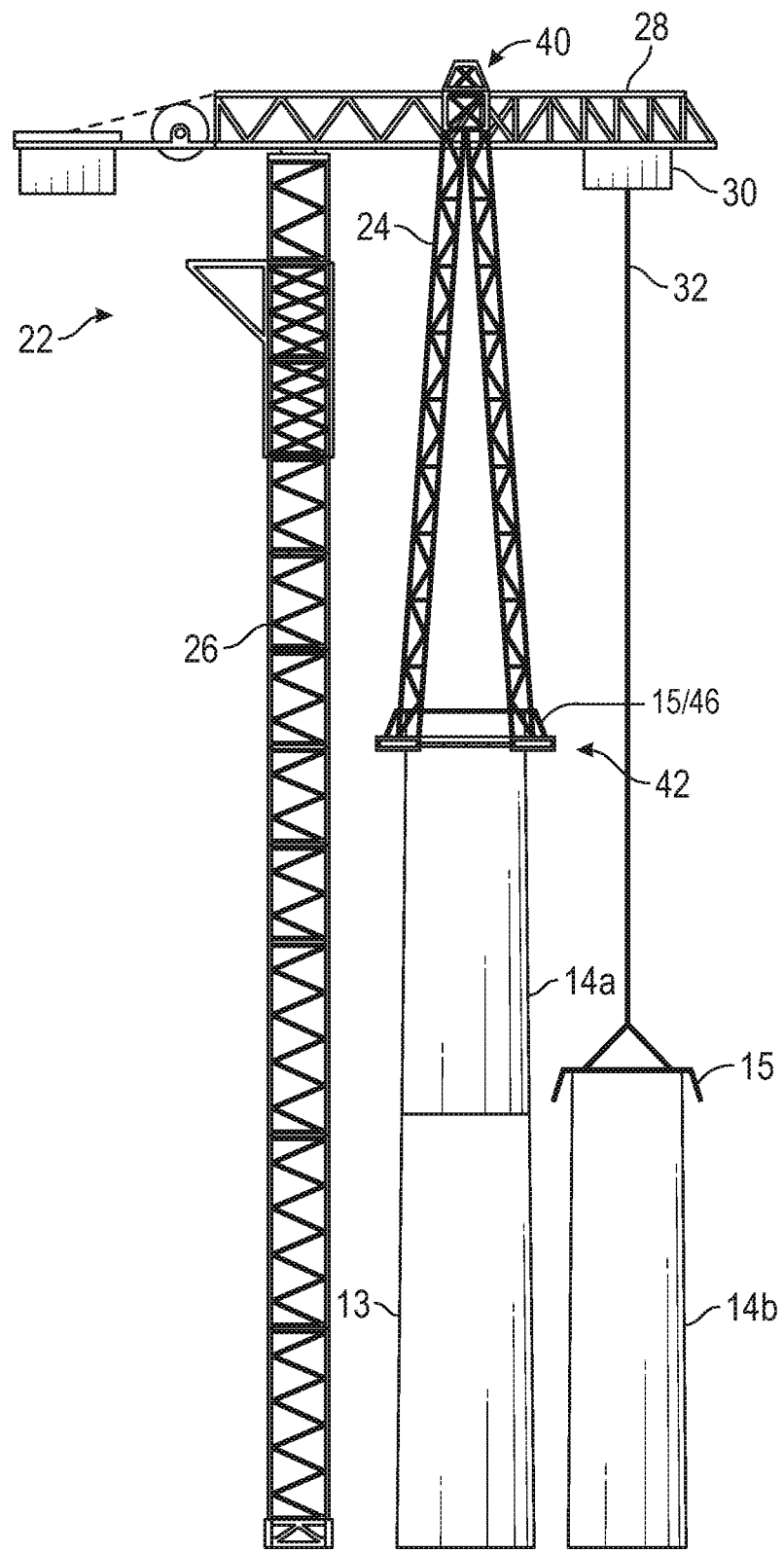
Figure 11:
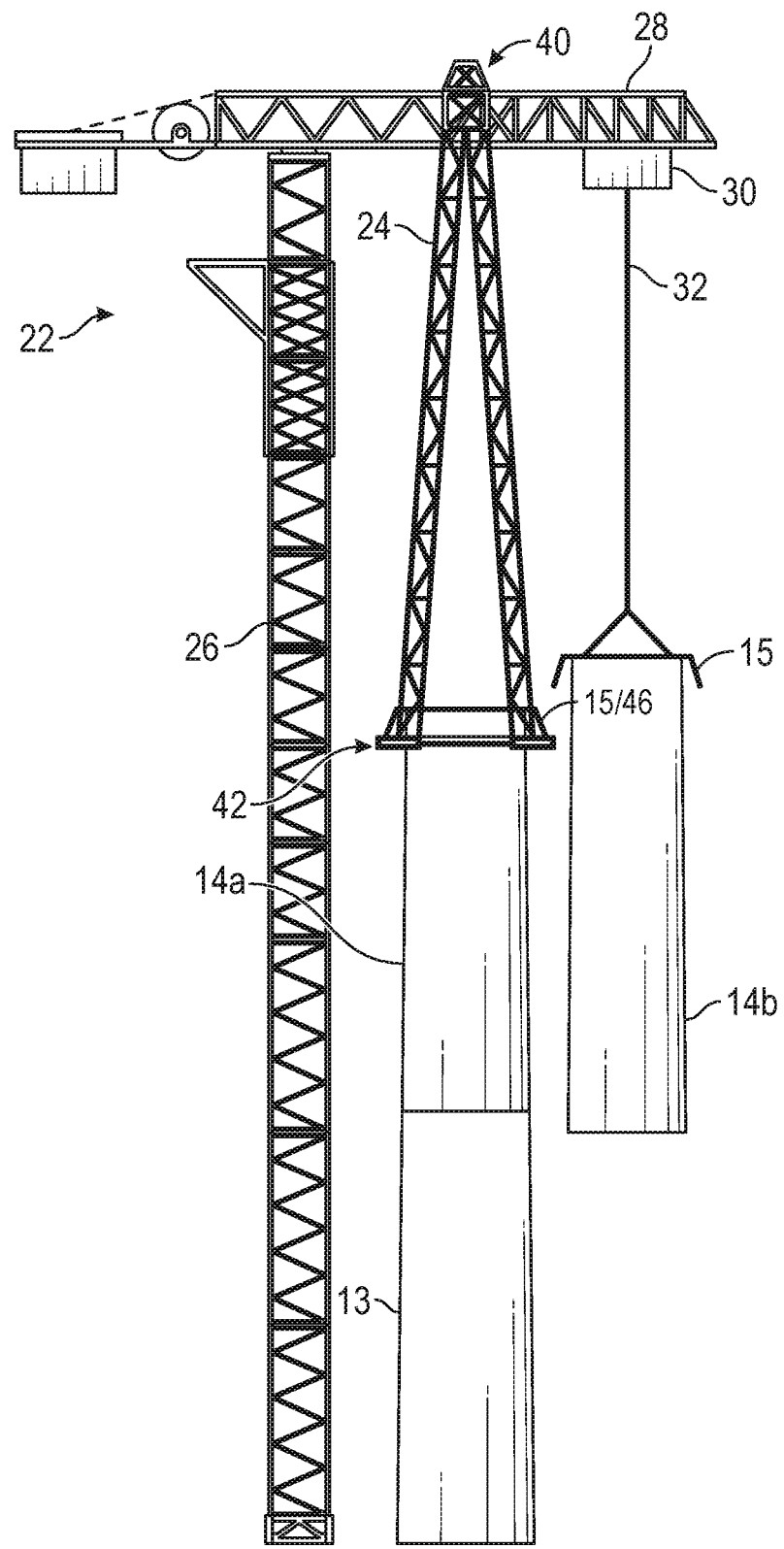
Figure 12:
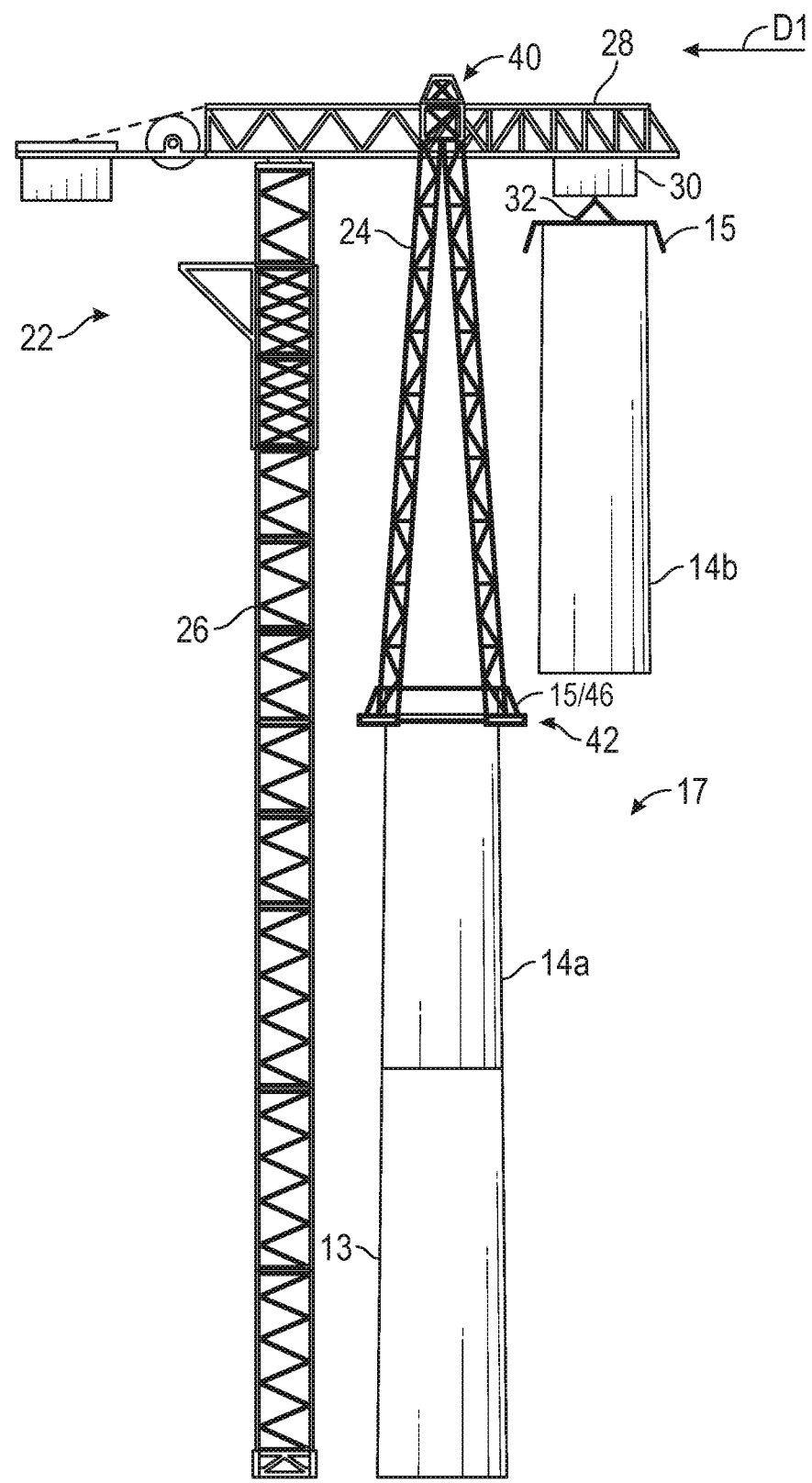

FIG. 9 illustrates the LS support member 24 attached to the upper-most tower section, i.e., tower section 14a, and is in a position to begin lifting another tower portion. As shown in FIG. 10, the load cable 32 can be lowered and coupled to the next tower section, i.e., tower section 14b, for lifting. Shown in FIGS. 11 and 12, the tower crane 22 is used to lift tower section 14b. As discussed herein, the LS support member 24 is coupled to the boom 28 such that a portion of the vertical load experienced by the boom 28 is transferred to the tower stack 17 via the LS support member 24.

Since a portion of the vertical load is transferred to the tower stack 17, less of the overall lifting capacity of the tower crane 22 is used while lifting the tower section 14a, as compared to lifting the lower section 14b without the LS support member 24 under the same lifting conditions (e.g., wind speed, etc.). The difference in overall capacity used for lifting an object (e.g., but not limited to, a tower section, nacelle, or blade) with the LS support member 24 and lifting the object without the LS support member 24 can be characterized as a "gained capacity" or "freed up" capacity. The gained capacity is an amount of the overall capacity of the tower crane 22 that would have otherwise been used for lifting the object if not for the LS support member 24. While lifting an object with the LS support member 24 coupled to the tower stack 17, the gained capacity can be utilized by increasing the wind limit of the tower crane 22.

As discussed herein, the LS support member 24 allows for smaller, less expensive tower cranes to be used for lifts that otherwise would require expensive tower cranes having a higher maximum lifting capacity. Further, the LS support member 24 minimizes potential down time due to wind conditions. For example, certain wind conditions can reduce the overall capacity of a tower crane. However, the LS support member 24 can make up for a certain amount of the capacity lost to the wind such that the wind conditions that would require down time are minimized. That is, the gained capacity during lifting can increase the wind limit to minimize down time.

Figure 13:
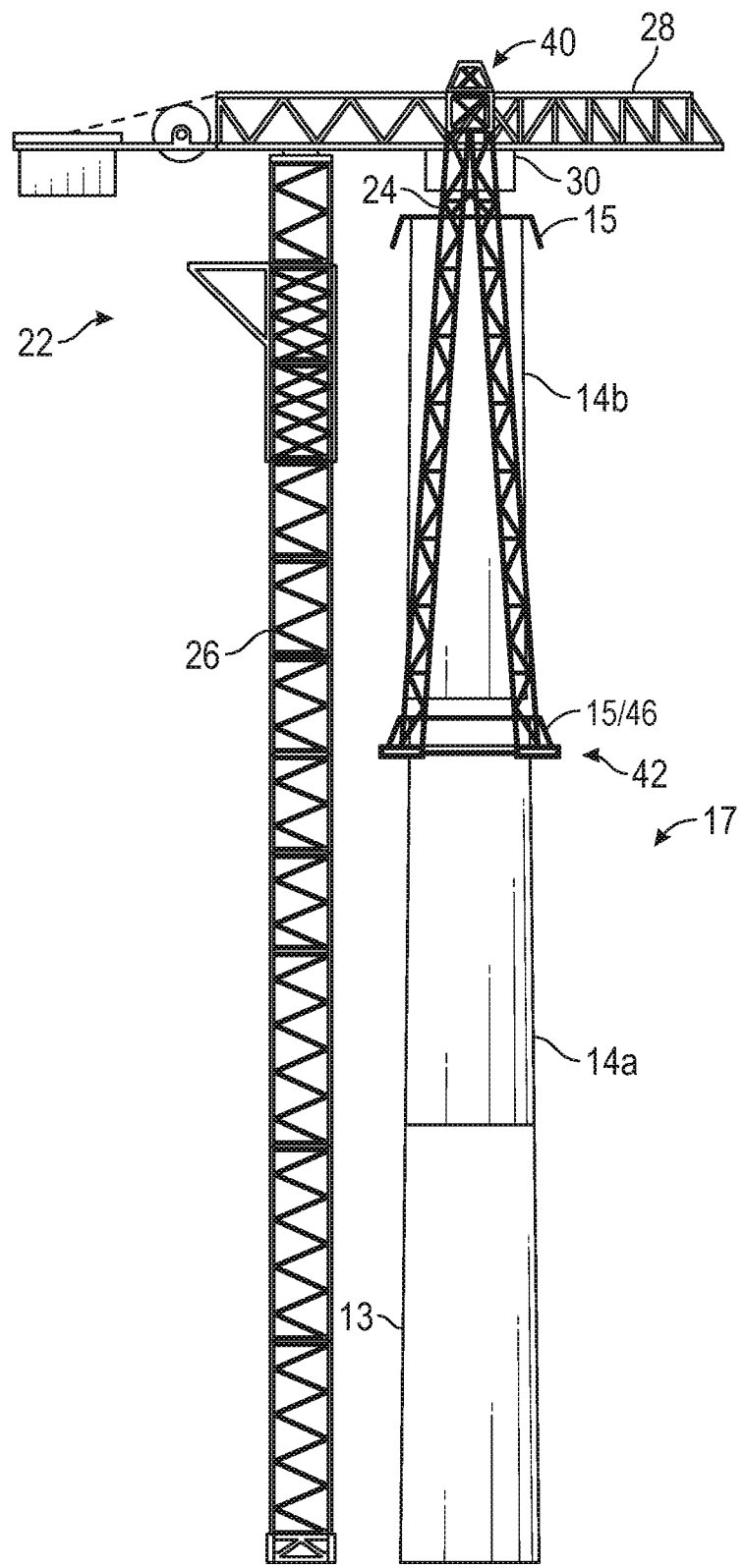
Figure 14:
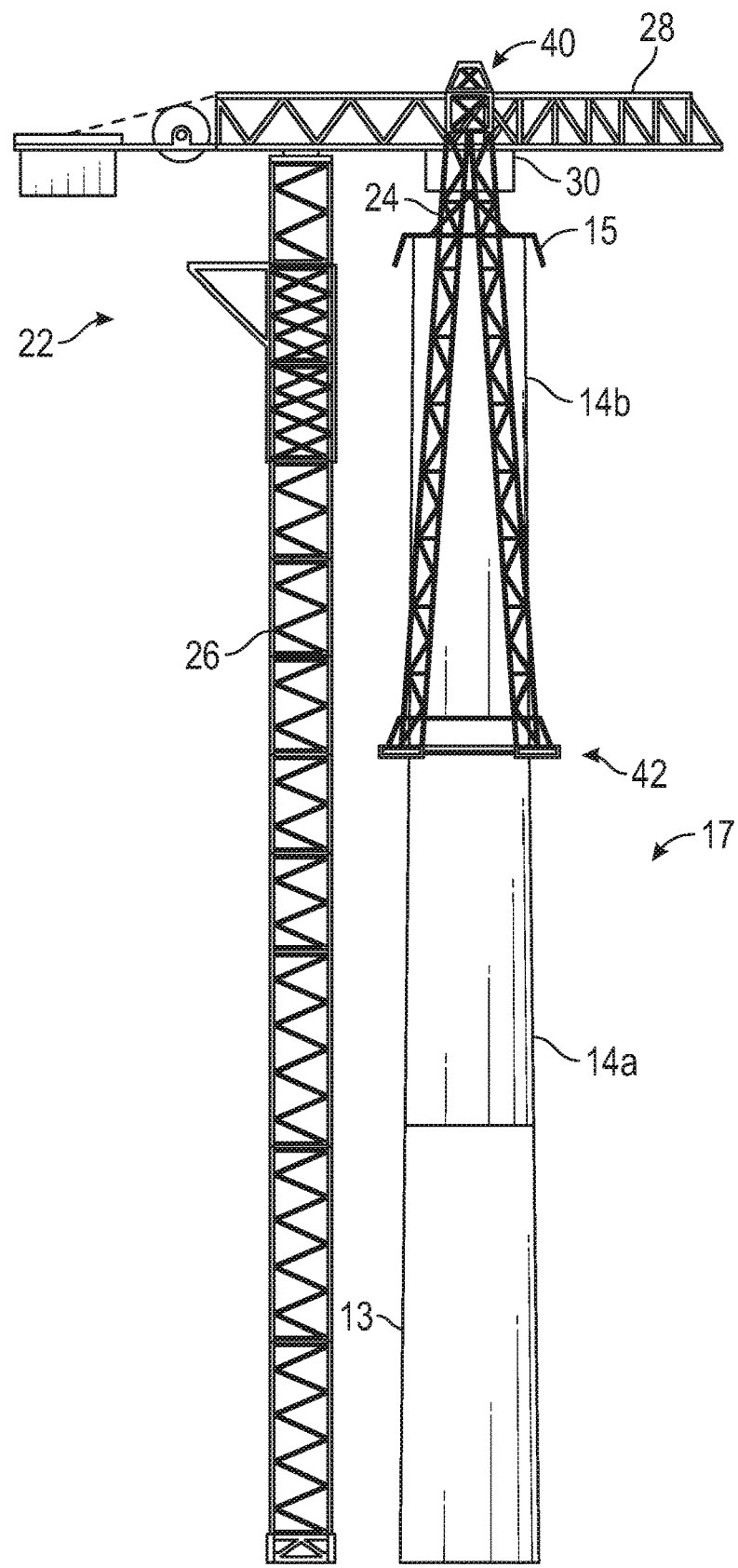
Figure 15:
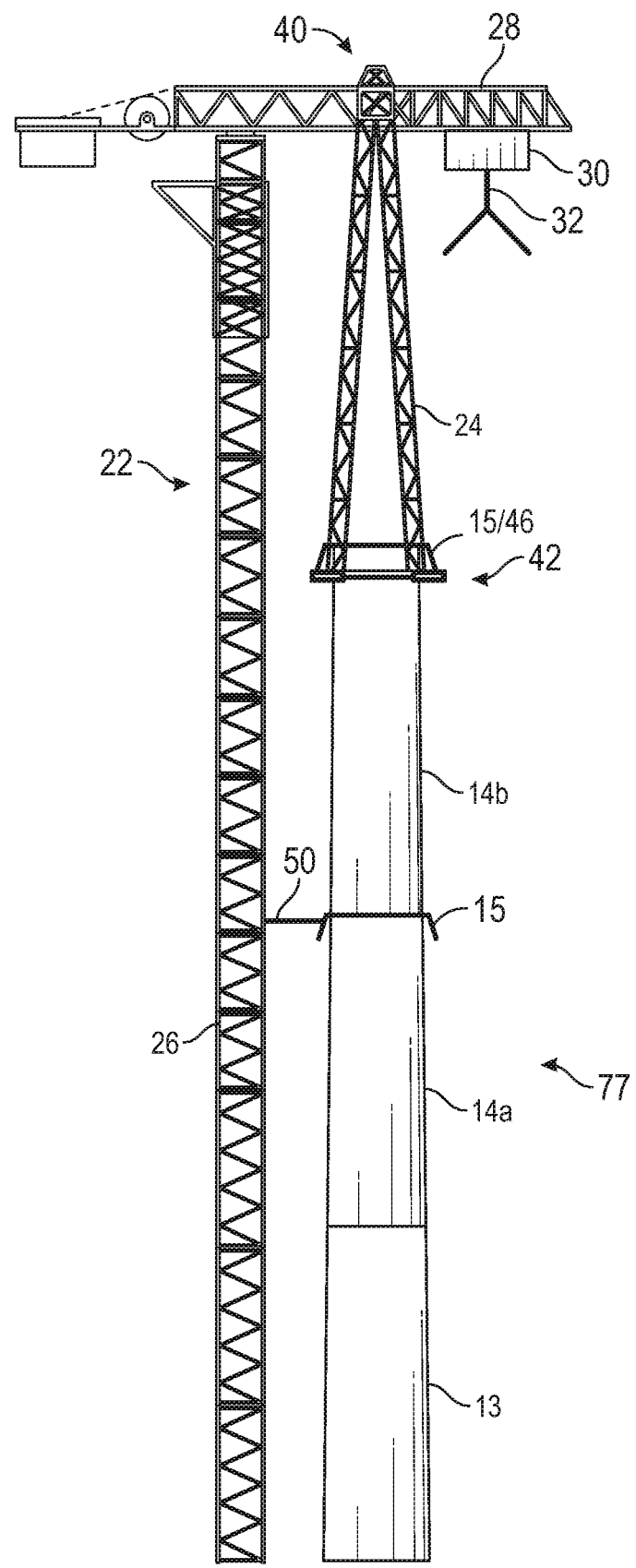

Once the tower section 14b clears tower section 14a the trolley 30 can move along the boom 28 in direction D1 (see FIG. 12) and position the tower section 14b above and adjacent to tower section 14a, as shown FIG. 13. The trolley 30 can lower the tower section 14b and tower section 14b can be coupled to tower section 14a, as shown in FIG. 14. Before or after the tower section 14a and tower section 14b are coupled together, the tension members 46 coupling the LS support member 24 to tower section 14a can be removed. Once the tension member 46 are removed, the height of the tower crane 22 can be increased, e.g., by installing one or more tower crane sections. The height of tower crane 22 can be increased such that the second end portion 42 of the LS support member 24 is positioned adjacent to the hanger plate 15 of the new upper-most tower section, i.e., tower section 14b, as seen in FIG. 15. The tension members 46 can be coupled between the LS support member 24 and the hanger plate 15 of tower section 14b to secure the LS support member 24 to the tower stack 17. In one example, a lateral support beam 50 can couple between the hanger plate 15 of tower section 14a and the crane tower 26 to provide lateral support. In preparation for the next lift, the trolley 30 can move along the boom 28 to get in position to lift another tower section. The process of lifting a tower section and attached the LS support member 24 to each new upper-most tower section can be repeated numerous times until the desired overall height of the tower stack 17 is achieved.

Figure 16:
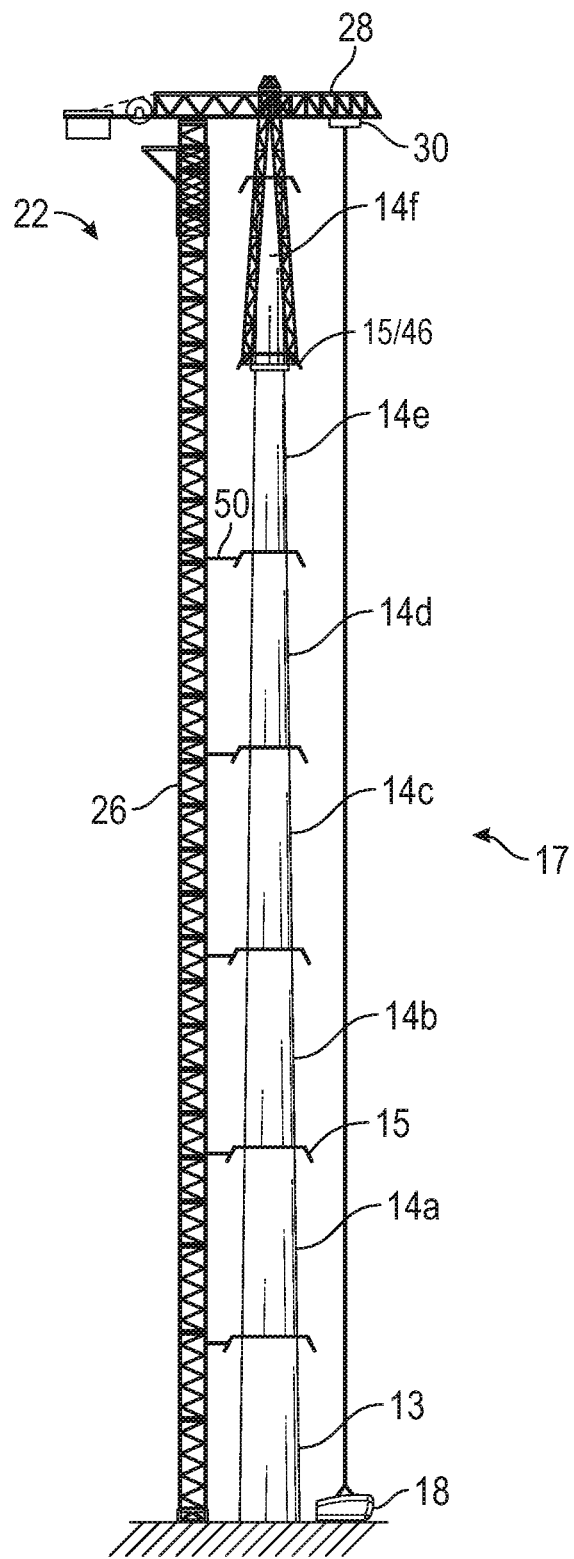
FIGS. 16-19 are side views of the LS support member in FIGS. 6-15 during a sequence of steps during lifting a nacelle, according to one or more embodiments.
Figure 17:
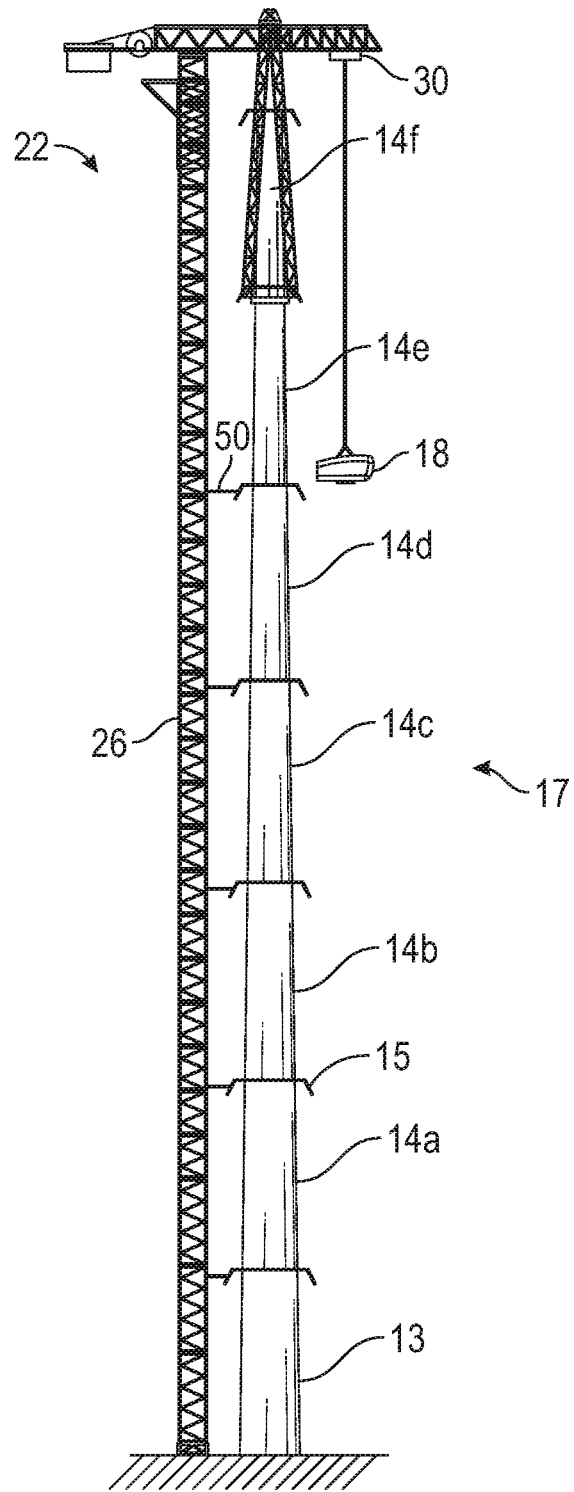
Figure 18:
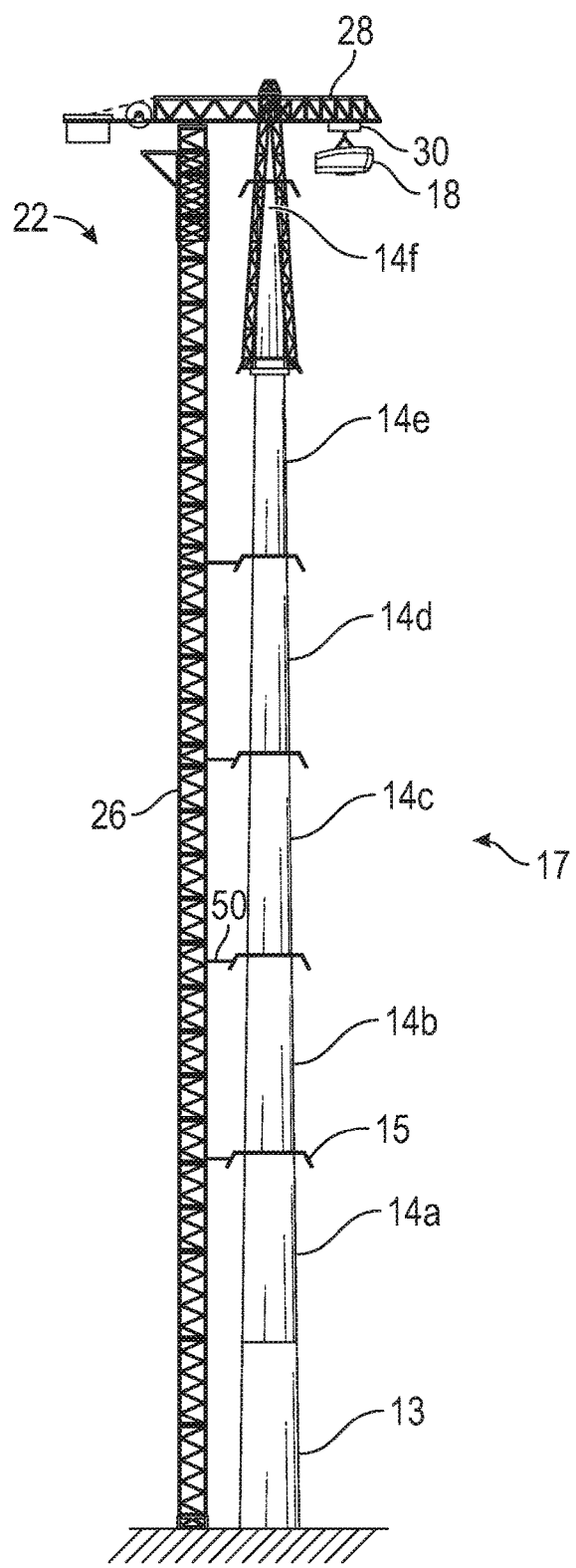

FIG. 16 illustrates a completed tower stack 17 including the tower base section 13 and six tower sections 14. In the example shown in FIGS. 3-16, the two sections (e.g., the base tower section 13 and the first tower section 14a) were lifted and assembled using the mobile crane and the next five tower sections 14 (tower sections 14a-f) were lifted and assembled using the tower crane 22 and the LS support member 24. While the example shown includes seven tower sections including the base tower section 13 and six tower sections 14, any number of tower sections can be used. In one example, the seven tower sections are assembled such that the tower stack 17 has a height of approximately 192 meters (approximately 631 feet). However, tower stacks reaching heights greater than 192 meters and less than 192 are contemplated. In the example shown, the tower crane 22 includes three base sections each being 38 feet (11.6 meters) tall and twenty-one tower sections each being 19 feet (5.8 meters) tall, thereby positioning the boom 28 at about 631 feet (192 meters). Again, the tower stack 17 and tower crane 22 shown in FIG. 16 are just one example, but other heights can be assembled.

As discussed herein, the LS support member 24 used to lift the tower sections 14 can be constructed to have the capacity to also be used for the nacelle lift, which is the heaviest lift during wind tower assembly. For example, in one example, the tower sections 14 can have a weight between about 88.5 tons to about 121 tons. In one example, the nacelle can have a weight of about 291 tons. Thus, if the LS support member 24 is to be used for both the tower sections 14 and the nacelle 18, the LS support member 24 should have a lift capacity greater than the weight of the nacelle 18.

The LS support member 24 and the components of the wind assembly can have various weights and be lifted using a single LS support member or different LS support members. In one example, the nacelle 18 can be broken down into three sub-assemblies (e.g., about 70 metric tons each) and each tower section 14 are about 70 metric tons. In another example, a crane (e.g., a 70 metric ton crane) can be used to assemble the tower stack 17 and the LS support member 24 can be used only for the nacelle lift. However, various configurations are contemplated.

As seen in FIGS. 16-19, lateral supports beams 50 are coupled between the tower stack 17 and the crane tower 22. For example, tower sections 14a-d include lateral support beams 50. However, the number of lateral support beams 50 used can vary depending on a variety of factors such as the height of the tower stack, among others.

Figure 19:
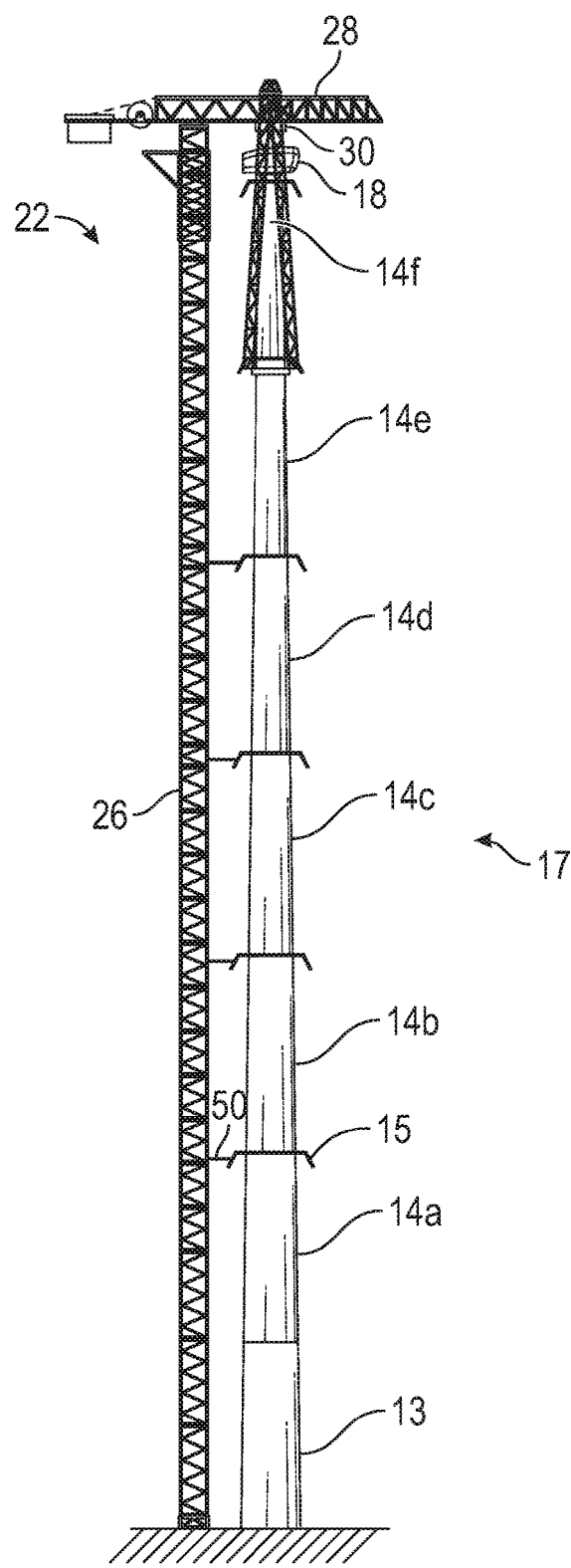
Figure 20:
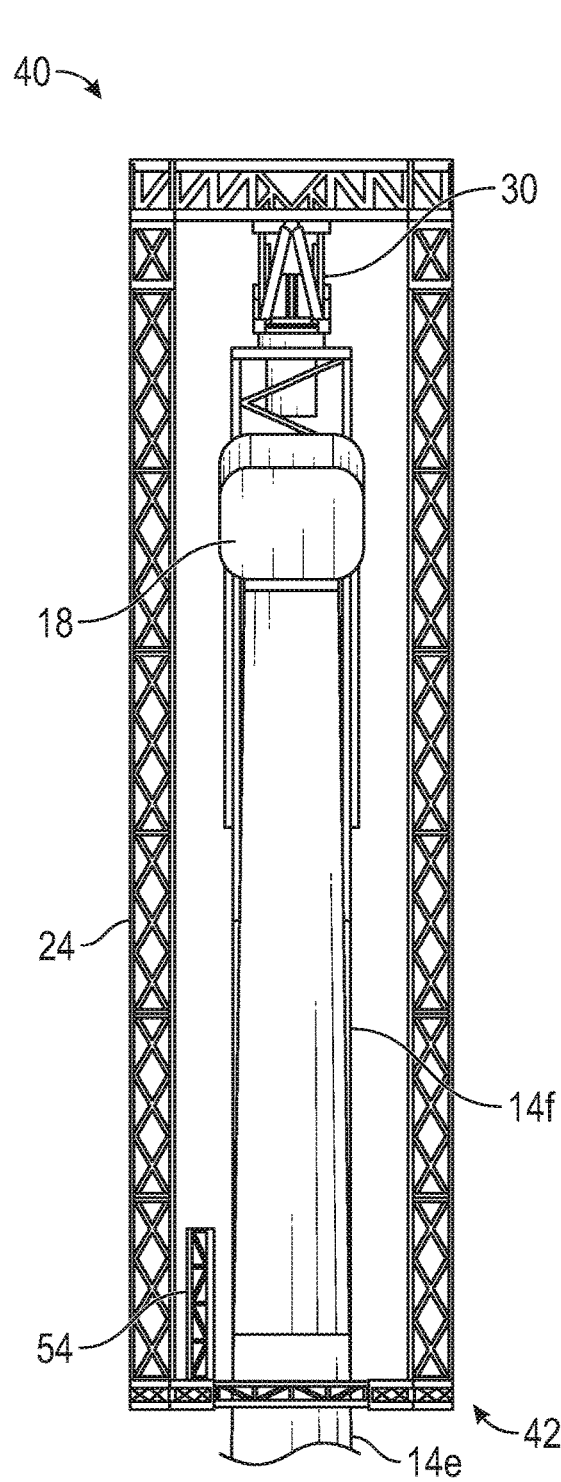
FIGS. 20-23 are side views of a sequence of steps to remove the LS support member from the tower crane, according to one or more embodiments.

In one example, once the last tower section, e.g., tower section 14f in this example, is coupled to the tower stack 17, the LS support member 24 remains coupled to the tower section, e.g., tower section 14e, directly below the upper-most tower section 14f while nacelle 18 is lifted. The nacelle 18 can generally have a height of about 15 feet (4.5 meters) such that there is sufficient clearance between the top of the upper-most tower section 14f and the bottom of the boom 28 to allow the trolley 30 and nacelle 18 to move along the boom 28 and be positioned between the boom 28 and the upper-most tower section 14f, as seen in FIG. 19. In one example, the tower crane 22 can self-climb such that the LS support member 24 is coupled to the hanger plate 15 of the upper-most tower section, e.g., tower section 14f, before the nacelle 18 is lifted and coupled to the tower stack 17.

While a single LS support member 24 is used in the examples shown in FIGS. 7-19 for lifting both the tower sections 14 and the nacelle 18, in some examples, a separate LS support member can be used specifically for lifting only the nacelle 18. For example, in certain instances, wind towers can be assembled with smaller capacity tower crane or mobile cranes. For example, these instances can include, but are not limited to, wind speeds, wind tower height, terrain slope, access road width, etc.) that make assembly with the smaller capacity tower cranes or mobile cranes possible. However, the smaller capacity tower cranes or mobile cranes while sufficient to lift the tower sections, may not have enough capacity to lift the nacelle. In some examples, the LS support member 24 can be used with the smaller capacity tower crane or mobile cranes to assist in lifting, e.g., the nacelle or one or more tower sections.

In an example where the LS support member is used for both the tower sections and the nacelle, not only does the capacity have to be high enough to handle the nacelle, but the overall length needs to be able to accommodate the tallest tower section as the tower sections are moved along the boom and coupled to the top of the tower stack while positioned within the LS support member (see FIGS. 14 and 16). When an LS support member is designed to be used only for lifting the nacelle, the overall length can be greatly reduced as a nacelle can have a height of, e.g., 15 feet (4.5 meters), compared to a tower section height of, e.g., 95 feet (29 meters).

Figure 21:
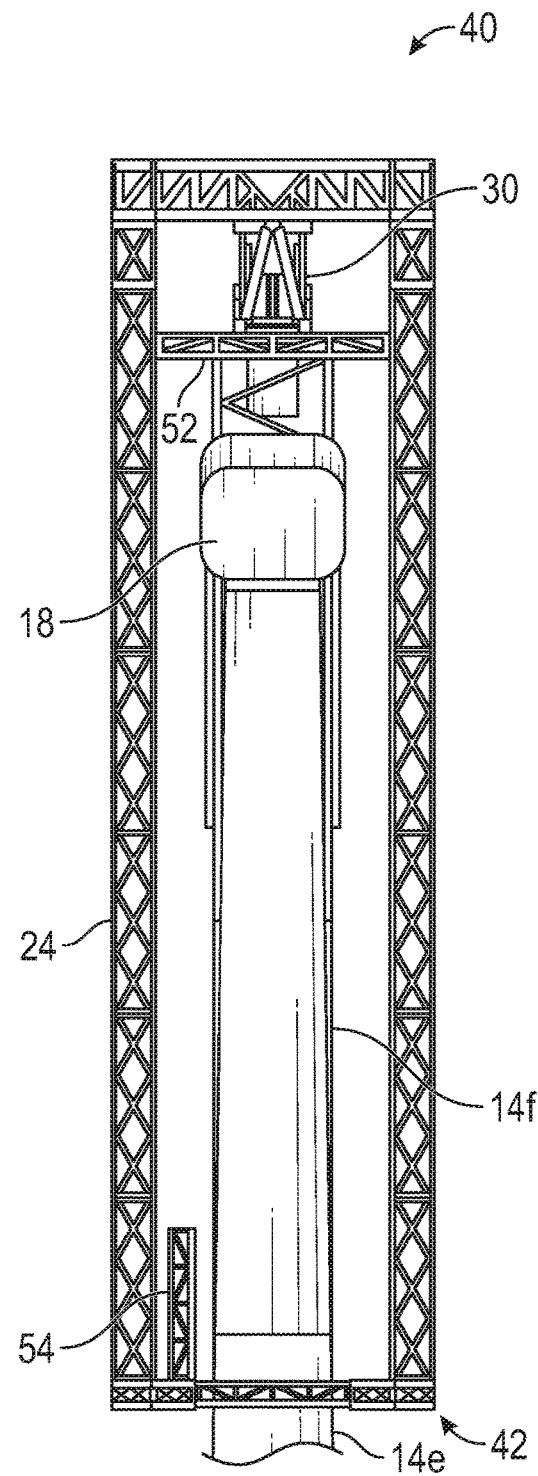
Figure 22:
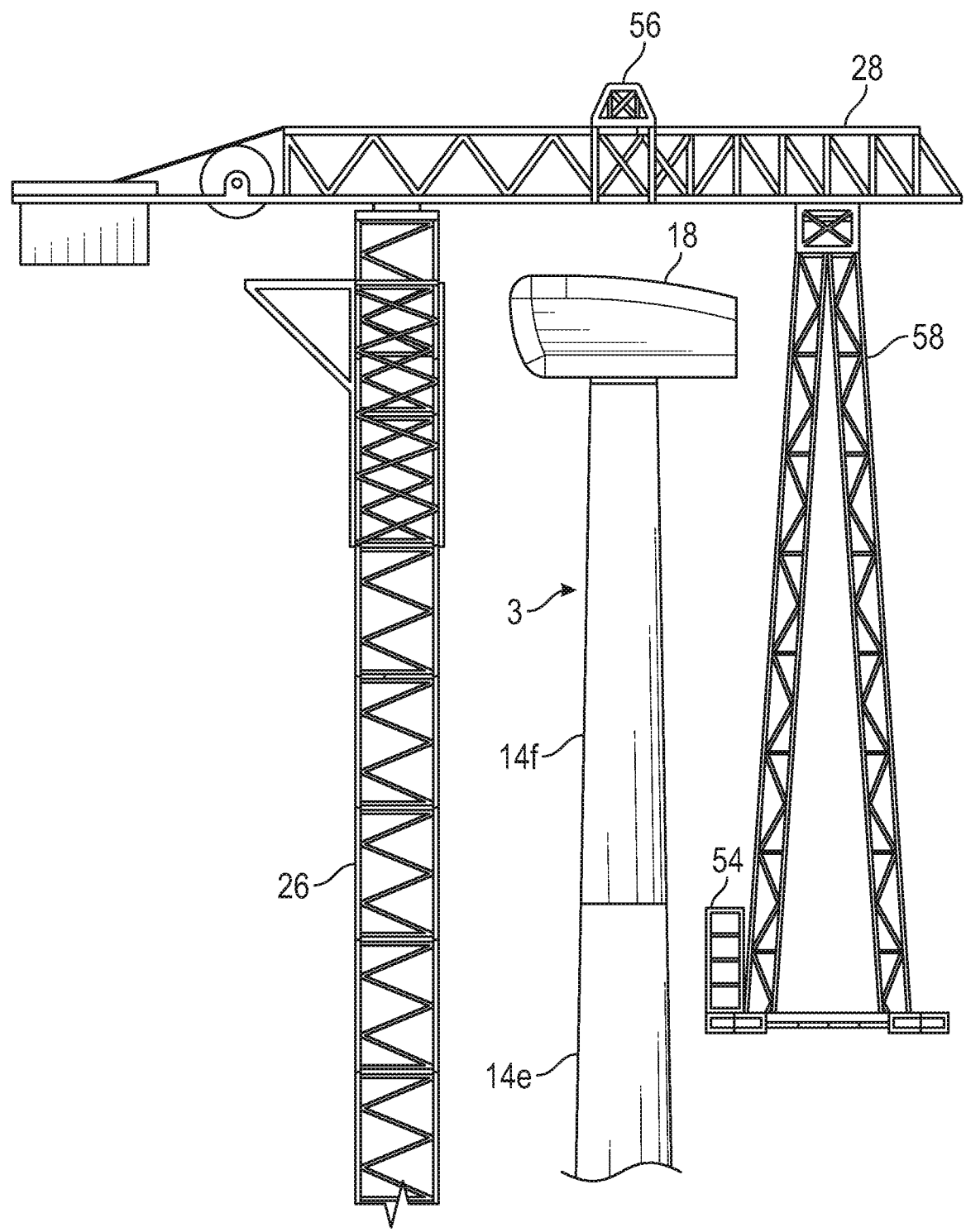
Figure 23:
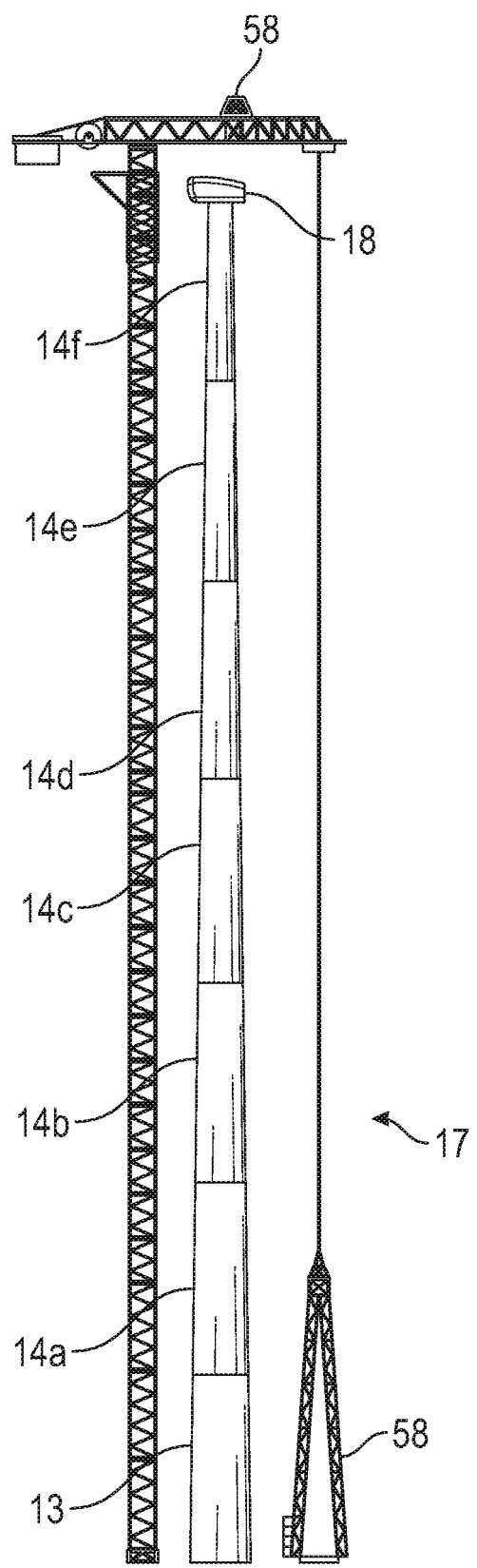

After the nacelle 18 has been lifted and coupled to the tower stack 17, the LS support member 24 can be removed and lowered. FIGS. 20-23 illustrate an example of the LS support member 24 being removed from the crane 22. In one example, a spreader 52 (see, e.g., FIG. 21) is used to lift the nacelle 18 can be rotated 90 degrees and coupled to a portion of the LS support member 24. A moveable member 54 of the LS support member 24 can be raised and the LS support member 24 can be moved along the boom 28 away from the tower crane 26. In one example, the LS support member 24 has a first portion 56 and a second portion 58 that are releasably coupled to each other to form the LS support member 24. As seen in FIGS. 21-23, the first portion 56 of the LS support member 24 can remain on the boom 28, while the second portion 58 can be removed and lowered. As discussed herein there can be a variety of ways to couple the LS support member 24 to the boom 28. Depending on the coupling mechanism, the LS support member 24 can be removed a variety of ways.

Figure 24:
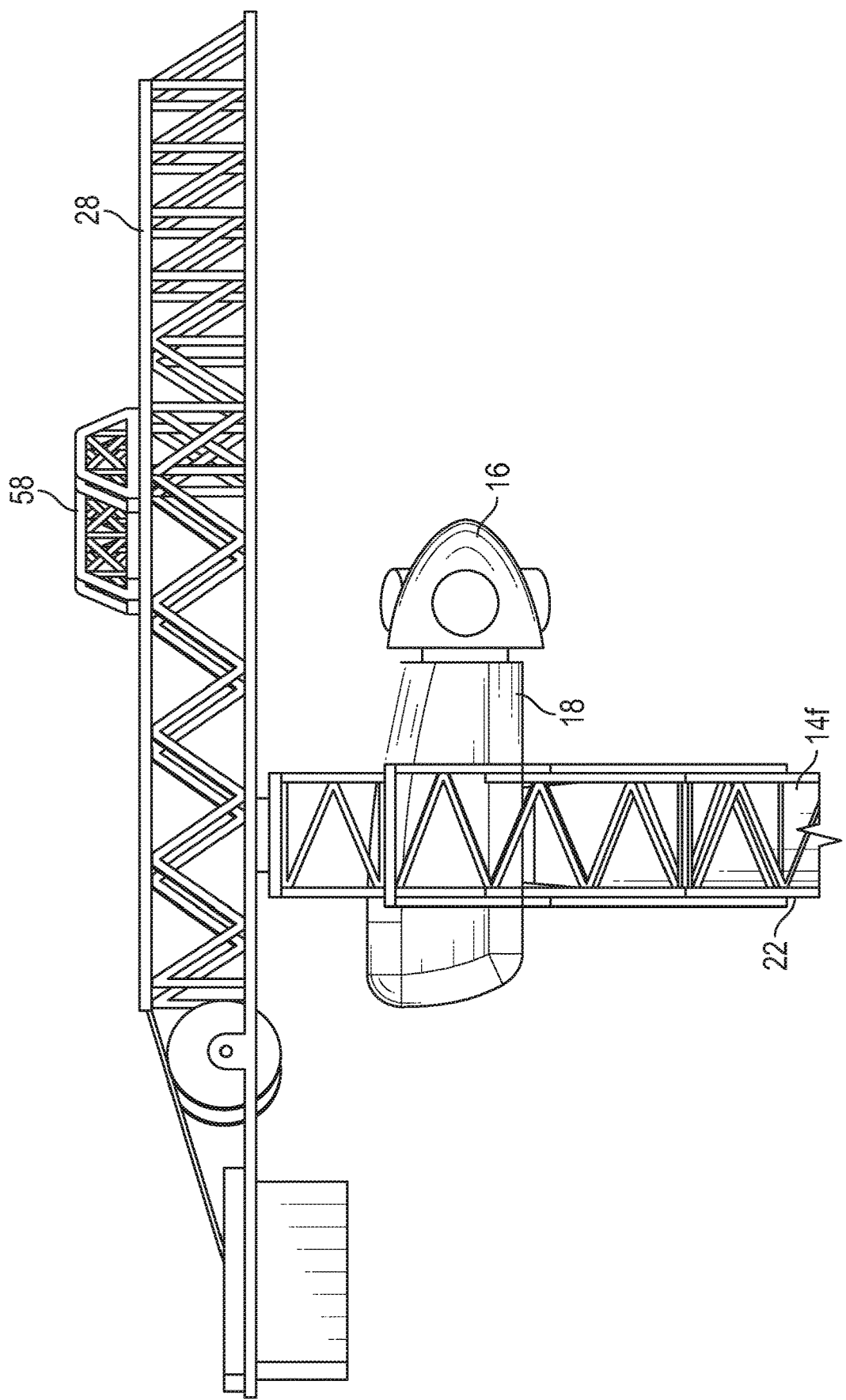
FIG. 24 is a side view of a hub attached to the nacelle, according to one or more embodiments.
Figure 25:
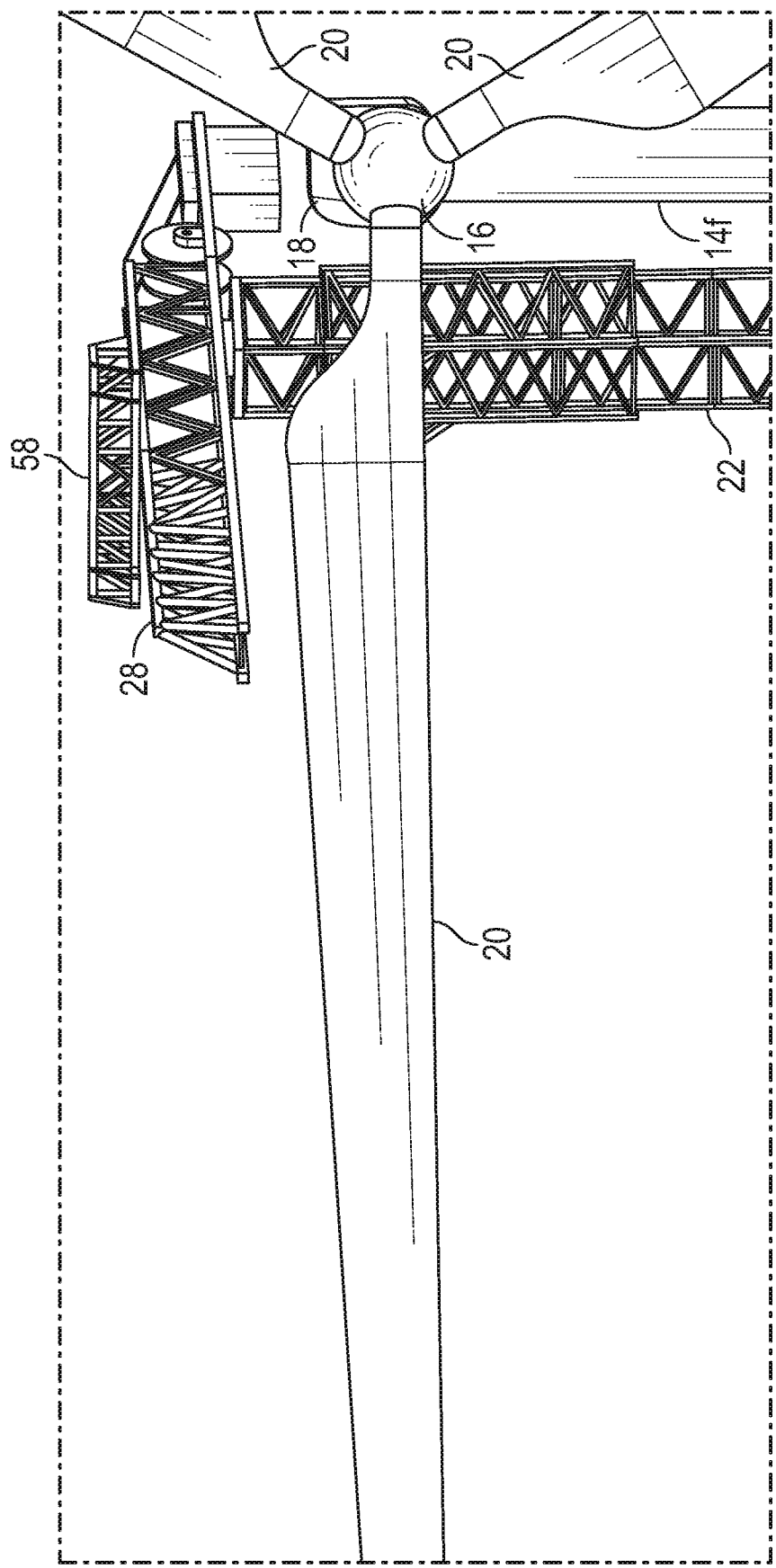
FIG. 25 is a side view of three rotor blades attached to the hub, according to one or more embodiments.

FIG. 24 illustrates the nacelle 18 being rotated 90 degrees clockwise and the hub 16 having been lifted and attached. The hub 16 can be secured to the nacelle 18 and the nacelle 18 can be rotated back 45 degrees counterclockwise before the three blades 20 are lifted and attached. FIG. 25 illustrates the three blades 20 attached to the hub 16.

Figure 26C:
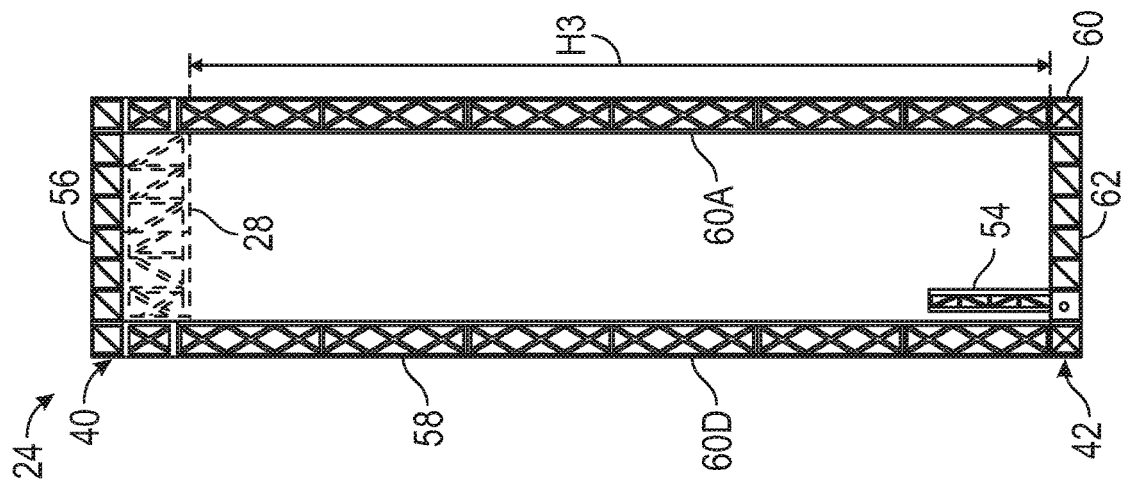
FIG. 26C is a side view of the LS support member shown in FIG. 26B with a moveable member in an open position, according to one or more embodiments.
Figure 26B:
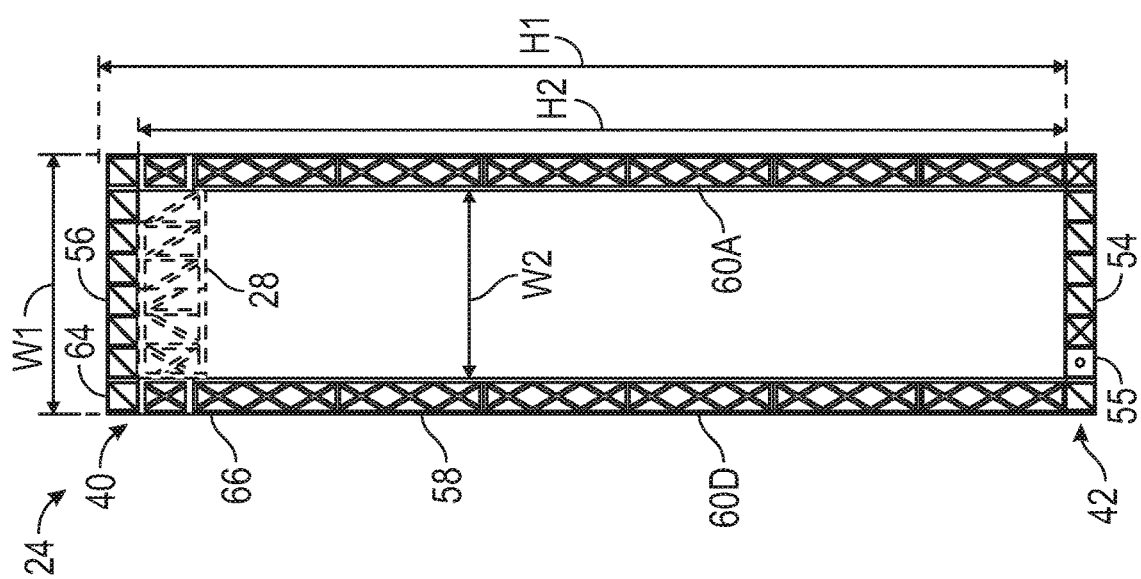
FIG. 26B is a side view of the LS support member in FIG. 26A rotated 90 degrees counter-clockwise, according to one or more embodiments.
Figure 26A:
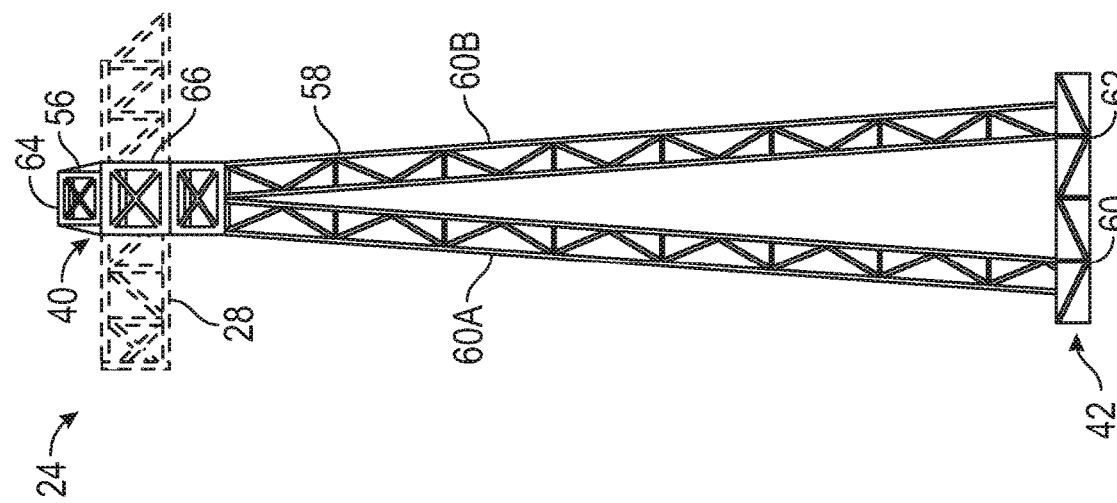
FIG. 26A is a side view of the LS support member shown in FIGS. 6-23, according to one or more embodiments.
Figure 26D:
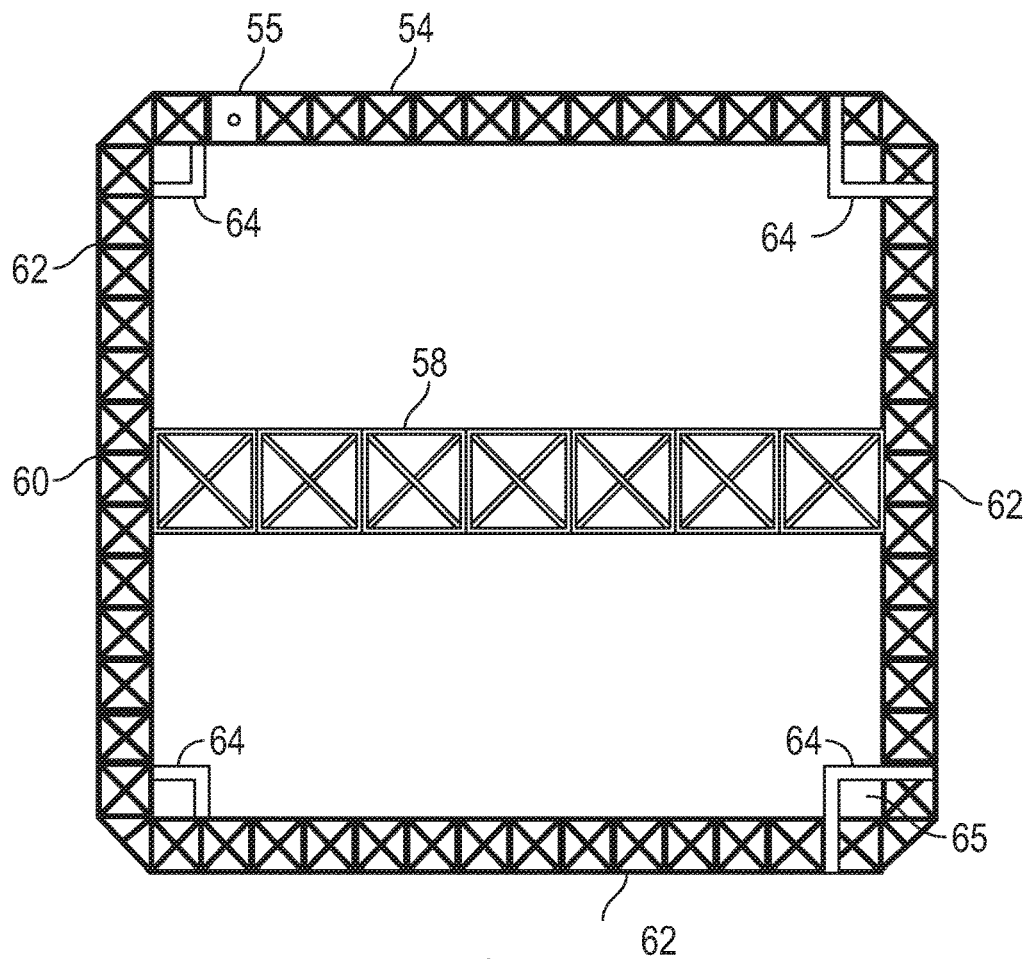
FIG. 26D is a bottom view of the LS support member, according to one or more embodiments.

FIGS. 26A-D illustrate the LS support member 24, in accordance with one embodiment. FIG. 26A illustrates a side view of the LS support member 24, FIG. 26B illustrates the LS support member 24 in FIG. 26A rotated 90 degrees counter clock-wise, FIG. 26C illustrates the LS support member 24 as shown in FIG. 26B but with a moveable member 54 in an open position, and FIG. 26D illustrates a bottom view of the LS support member 24. As shown in FIGS. 26A-C, the LS support member 24 extends from the first end portion 40 to the second end portion 42. In one example, the LS support member 24 is a truss structure and includes a plurality of vertical, horizontal, and web members. In one example, the LS support member 24 includes four columns 60A-D (collectively referred to herein as "columns 60") extending from the first end portion 40 to the second end portion 42. Each column 60 can include four masts arranged at the corners of a square. In other embodiments, the four masts can be arranged at the corners of a rectangle, whose aspect ratio may vary between embodiments. In other embodiments, fewer (e.g., three) or more (e.g., six) masts can be used to form the columns 60.

In one example, the first end portion 40 includes a cross-beam 64 and a side-beam 66. The columns 60 extend from the side beam 66 at the first end portion 40 to a rim 60 at the second end portion 42. The position of the boom 28 is represented by hash lines that illustrate the location of the boom 28, when the LS support member is coupled to the tower, in accordance with one embodiment. As discussed herein, the LS support member 24 can be configured from at least two reversibly coupled portions, e.g., a first portion 56 and a second portion 58. That is, when the LS support member 24 is removed from the tower, the first and second portions 56, 58 can uncouple and the second portion 58 can be removed from the tower. In one example, the first section 56 includes the cross-beam 64. In another example, the first section 56 includes the cross-beam 64 and a portion of the side-beam 66.

The rim 60 is configured to be lowered over and coupled to a tower section via the hanger plate. The rim 60 can include a plurality of stationary members 62 and at least one moveable member 54 that can move between a closed configuration (FIG. 26B) and an open configuration (FIG. 26C). As discussed herein, the moveable member 54 is positioned adjacent to the tower crane 26 (see FIG. 22), such that when the moveable member 54 is opened (i.e., rotated about a hinge 55), the LS support member 24 can move along the boom 28 away from the tower crane 26 and the tower stack 17.

The example shown can generally have two (2) vertical A-frame members and have an overall height $H_1$ and an overall width $W_1$. The inner width $W_2$, shown in FIGS. 26B and 26C can be sufficient to receive the boom 28 and receive the tower sections. Further, inner height $H_2$ should be sufficient such that the height $H_3$ between the bottom of the boom 28 to the rim 60 can receive a tower section and the trolley.

FIG. 26D illustrates a bottom-up view of the LS support member 24. As seen in FIG. 26D, the rim 60 includes three stationary members 62 and the moveable member 54. While illustrated as a square, additional shapes are contemplated such as a rectangle, circle, hexagon, or other shapes. In one example, each corner includes coupling members 64 that define an opening 65A. The coupling members 64 are configured to be coupled with the tension members (see tension members 46 in, e.g., FIG. 13). Again, while four evenly distributed tension members and coupling locations can be used, other variations such as six (6) evenly distributed tensions members/coupling locations for a hectogon shape and eight (8) evenly distributed tension members/ coupling locations for an octagon shape.

As discussed herein, the shape and dimensions of the LS support member 24 can vary depending on the type of lift and what components the LS support member will be lifting. In one non-limiting example where the LS support member 24 will be used to lift both the tower sections and the nacelle, the overall capacity can be about 265 metric tons. In this example, the LS support member 24 can have two (2) vertical A-frame members and have an overall height of about 41 m (134 ft). The second end portion 42 can define a base frame square configuration having a length of 9.75 m (32 ft) and a width of 9.75 m (32 ft). In one non-limiting example where the LS support member 24 will be used to lift just the tower sections, the overall capacity can be about 70 metric tons. In this example, the LS support member 24 can have two (2) vertical A-frame members and have an overall height of about 36.5 m (120 ft). The second end portion 42 can define a base frame square configuration having a length of 9.75 in (32 ft) and a width of 9.75 m (32 ft). In one non-limiting example where the LS support member 24 will be used to lift just the nacelle, the overall capacity can be about 265 metric tons. In this example, the LS support member 24 can have two (2) vertical A-frame members and have an overall height of about 16.7 m (55 ft). The second end portion 42 can define a base frame square configuration having a length of 9.75 m (32 ft) and a width of 9.75 in (32 ft).

Figure 27:
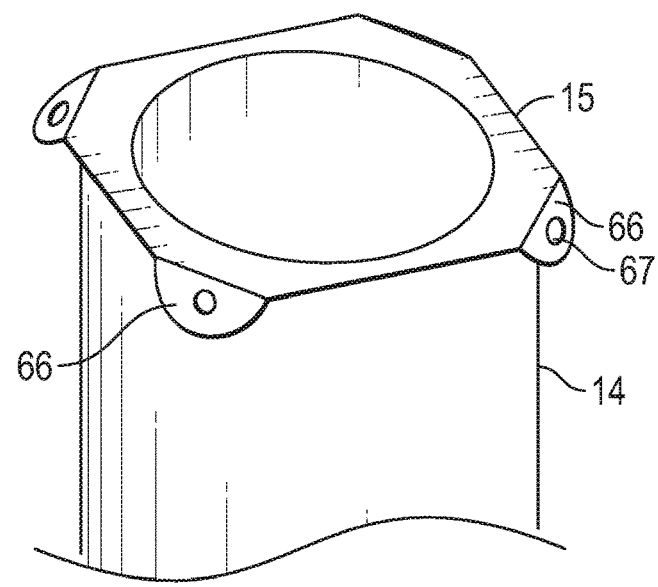
FIG. 27 is a perspective view of a top of a tower section, according to one or more embodiments.

FIG. 27 illustrates the hanger plate 15 on a tower section 14. As seen in FIG. 27, the hanger plate 15 includes four lateral flanges 66 that define an opening 67. The opening 67 is configured to couple to the tension members, as discussed herein, to couple the LS support member 24 to the tower section 14.

Figure 28:
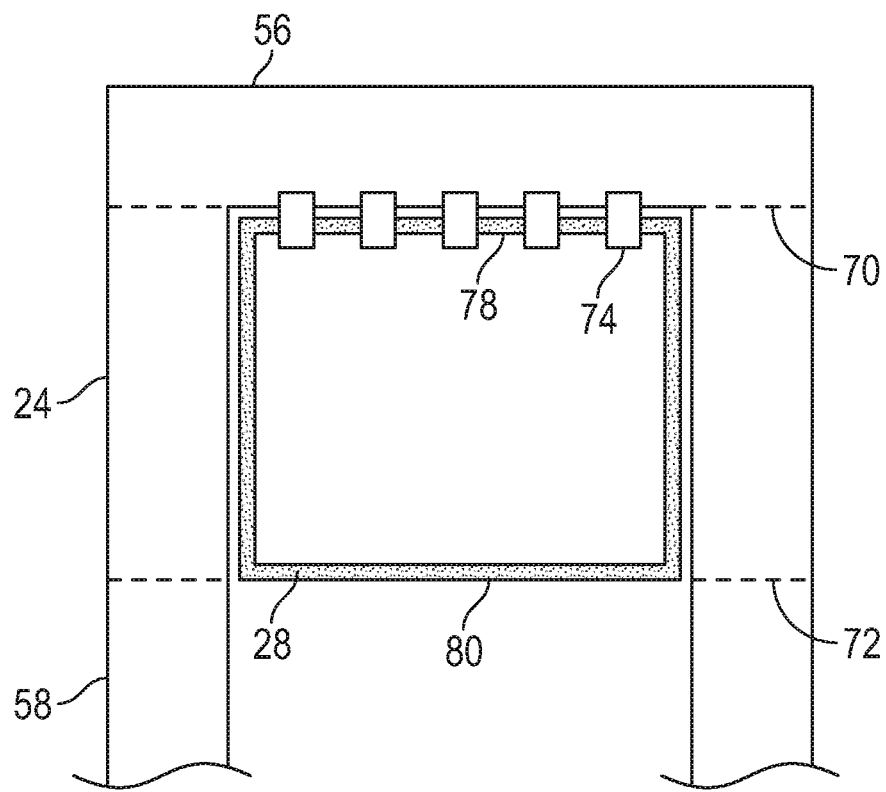
FIG. 28 is a simplified cross-section view showing an example of the LS support coupled to the tower, according to one or more embodiments.
Figure 29:
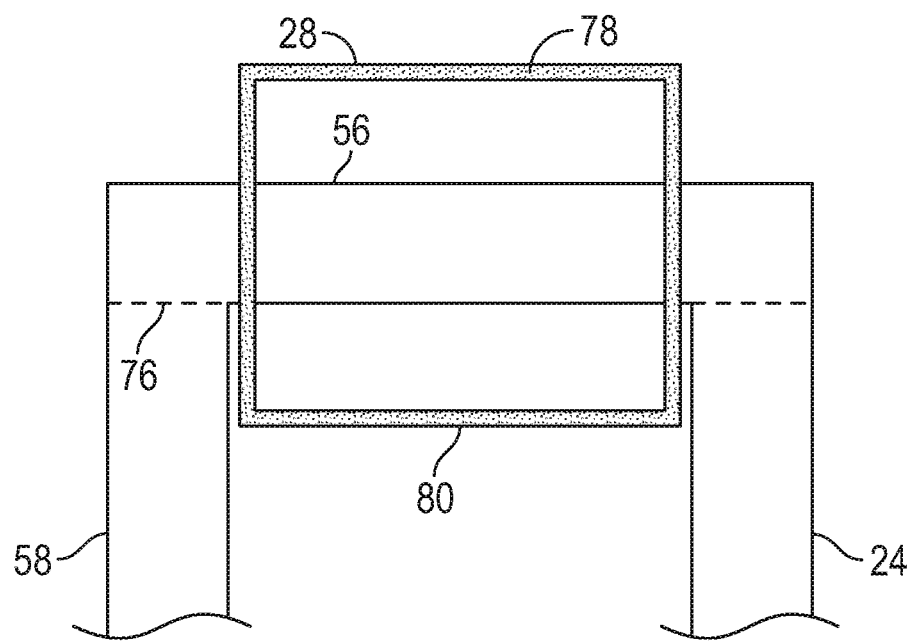
FIG. 29 is a simplified cross-section view showing another example of the LS support coupled to the tower, according to one or more embodiments.

FIGS. 28 and 29 illustrate simplified representations of the LS support member 24 coupled to the boom 28. As seen in FIG. 28, the LS support member 24 is placed over the top 78 of the boom 28. The boom 28 and the LS support member 24 can, e.g., be coupled together, via fasteners 74. Other fastening mechanisms such as hinges, ball and socket, pivot joints, are contemplated. The boom 28 is coupled to the LS support member 24 via a connection mechanism and acts as a supported beam. However, once the LS support member 24 is coupled to the boom 28, a portion of the vertical load is transferred to the tower stack via the LS support member 24.

In one example, the LS support member 24 can be formed of two parts. The LS support member 24 can separate into two parts, e.g., along line 70 or along line 72 FIG. 29 illustrates an example where the LS support member 24 extends through the boom 28 such that the LS support member 24 is positioned between the top 78 of the boom 28 and the bottom 80 of the boom 28. Various fastening mechanisms can be used to couple the LS support member 24 to the boom 28.

Figure 30A:
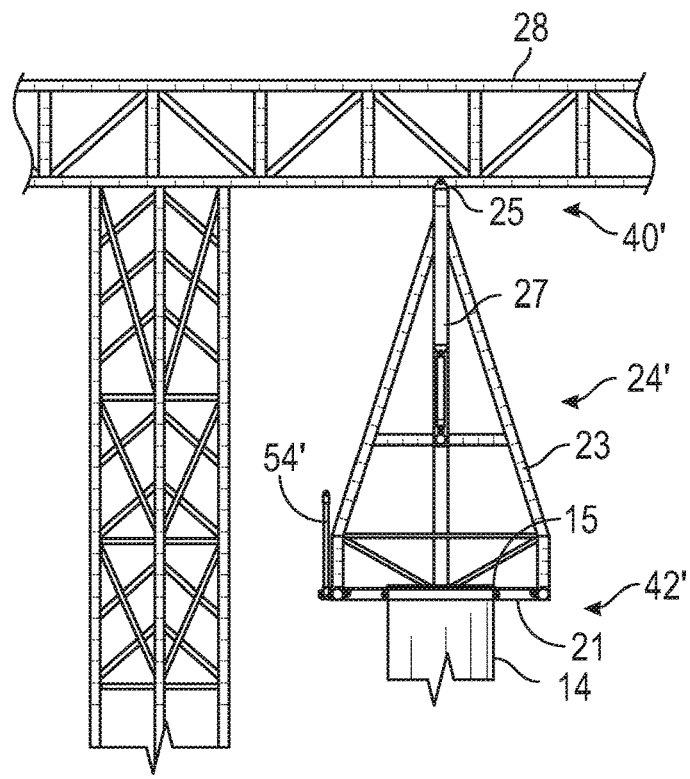
FIG. 30A is a front view of another example of a LS support member used to assemble a wind tower, according to one or more embodiments.
Figure 30B:
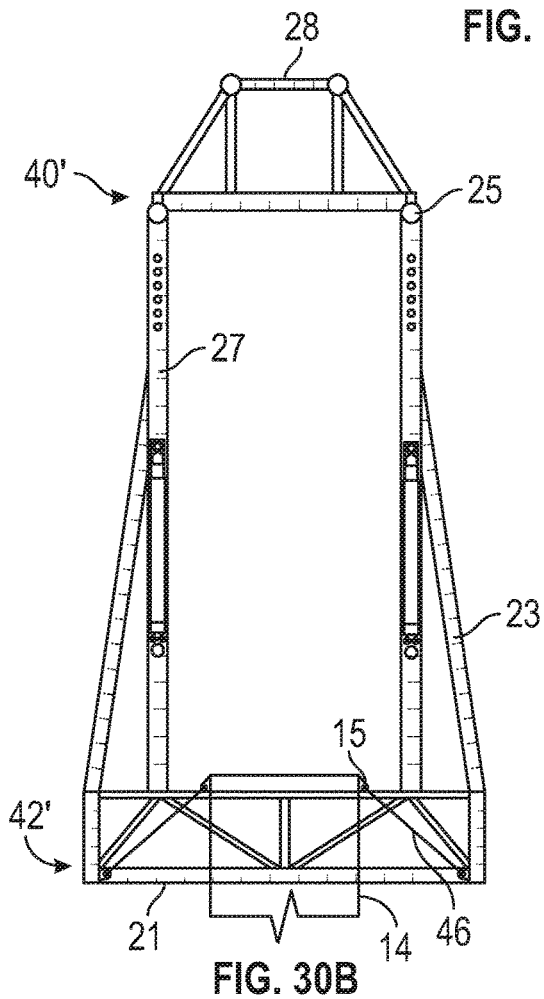
FIG. 30B is a simplified side view of the LS support member shown in FIG. 30A.
Figure 30C:
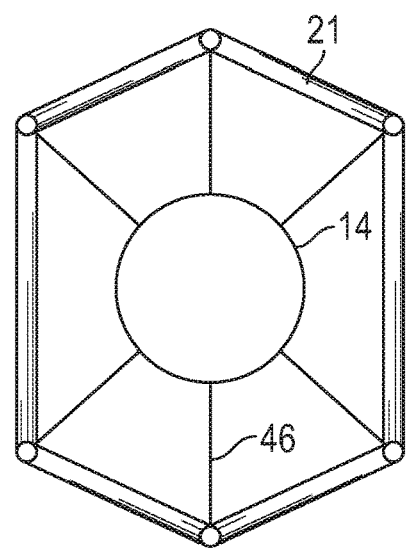
FIG. 30C is a cross-sectional view of the LS support member shown in FIG. 30A.

FIGS. 30A-C illustrate another example of an LS support member 24'. The LS support member 24' can be coupled to the boom 28 via a ball and socket connection 25. The LS support member 24' can extend from a first end portion 40' to a second end portion 42'. As shown in FIG. 30C, the shape of the second end portion 42' can be a hexagon shape having six coupling locations that couple with six tension members 46. The LS support member 24' can include the moveable member 54', as discussed herein. However, the LS support members 24' can include extendable arms 27 extending from the connection 25. As seen in FIG. 30A, the moveable arms 27 are in a collapsed position. While shown as the second end portion 42' is adjacent to the top of a tower section 14, the collapsed position can be such that the second end portion 42' is above the top of the tower section 14. In that example, moving the LS support member 24' along the boom 28 (e.g., during assembly or removal) can be done without utilizing the moveable member 54'. As seen in FIG. 30B, the moveable arms 27 are in an extended position such that the LS support member 24' has been lowered over the tower section 14 and can be coupled to the tower section 14 via tension members 26. In this example, depending on the type of tension members, the tensions members 46 can be coupled to the tower section 14 before or after the LS support member 24' is lowered to the extended position. The moveable arms 27 can be used with the LS support member 24 discussed herein. The moveable arms 27 can allow for additional positioning of the LS support member 24 about the tower section 14 without having to have the tower crane self-climb.

Having described multiple embodiments for erecting a tower with the LS support member 24 that is coupled to a boom 28 of the self-climbing, tower crane, the discussion now turns to a tower erecting system including a LS support member that can be used with a luffing-jib crane.

Figure 31:
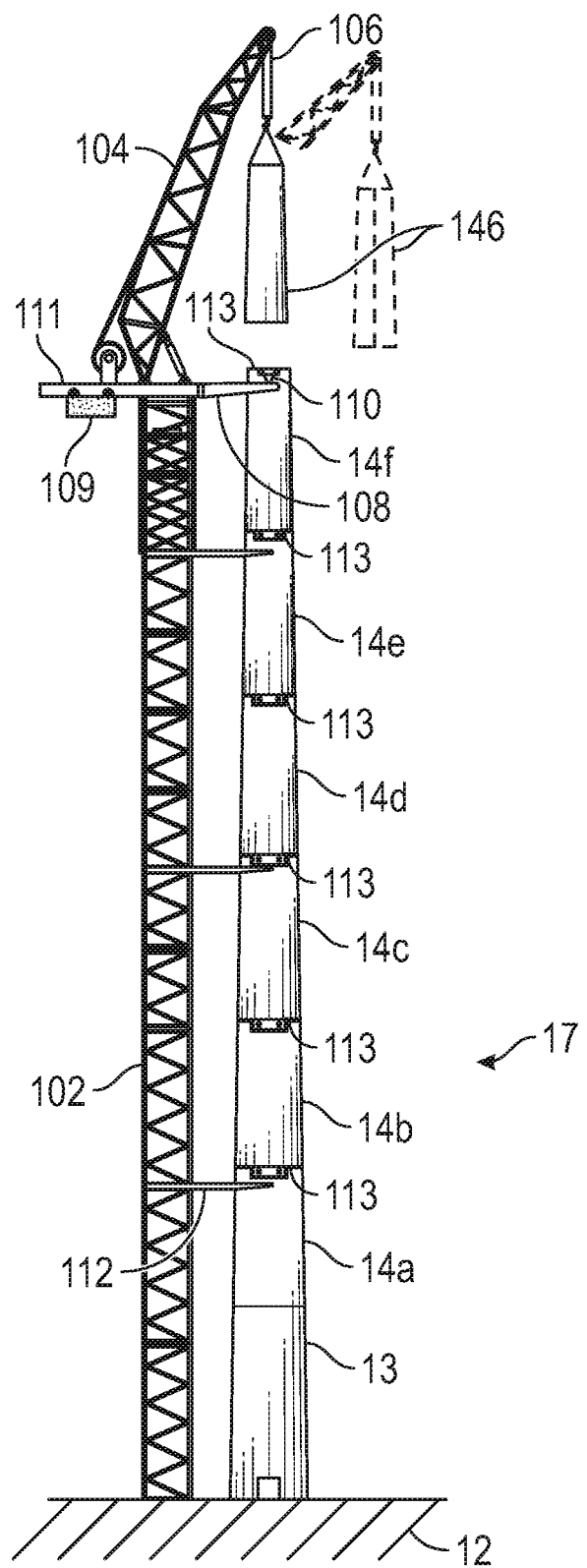
FIGS. 31-37 are side views of a sequence of steps using the LS support member shown in FIG. 30 to assemble a portion of the wind tower, according to one or more embodiments.

FIG. 31 is a side view of a partially assembled wind tower 10, such as wind tower 10 in FIG. 1, and a luffing-jib crane 100 (also referred to herein as "luffing crane 100" and "crane 100") used to erect the wind tower 10. The wind tower 10 can be the wind tower 10 in FIG. 1 and include a foundation 12, a tower base section 13 (including one or more tower base sections) and a plurality of tower sections 14a . . . n, e.g., tower sections 14a-g (collectively referred to as "tower sections 14), as shown in FIG. 31. The crane 100 can include a tower 102, a moveable jib 104, a counter jib 111, a counterweight 109, load cables 106, and a LS support member 108.

As described with reference to FIGS. 3-5, the tower base section 13 and one or more of the tower sections 14 can be assembled via a mobile crane and then the mobile crane can be used to assemble the tower. However, as compared to FIG. 5, the self-climbing tower in FIG. 31 is the luffing crane 100. Since the jib 104 of the luffing crane 100 moves vertically, the LS support member 108 is positioned at the top of the tower 102, e.g., an intersection between the counter jib 111 and the top of the tower 102. The LS support member 108 include two arms 108 extending from a first end 10 coupled to the tower 102 to a second end 109. The second end 109 is a free end and can be reversibly coupled to the upper-most tower section such that during a lift, where a subsequent tower section or nacelle is being lifted, a portion of the vertical load is transferred to the LS support member 108 and thereby transferred to the tower stack 17.

As seen in FIG. 31, the tower section 14g is being lifted to be attached to the tower stack 17, e.g., to tower section 14f. After tower section 14g is attached to tower section 14f, the luffing crane 100 can self-climb until the LS support member 108 is adjacent to the hanger plate of tower section 14g.

Figure 32:
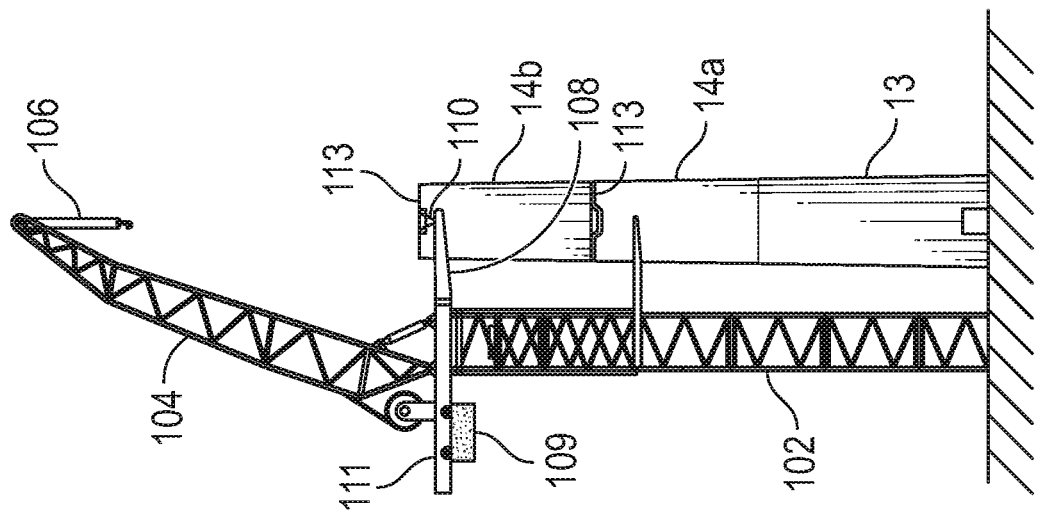
Figure 36:
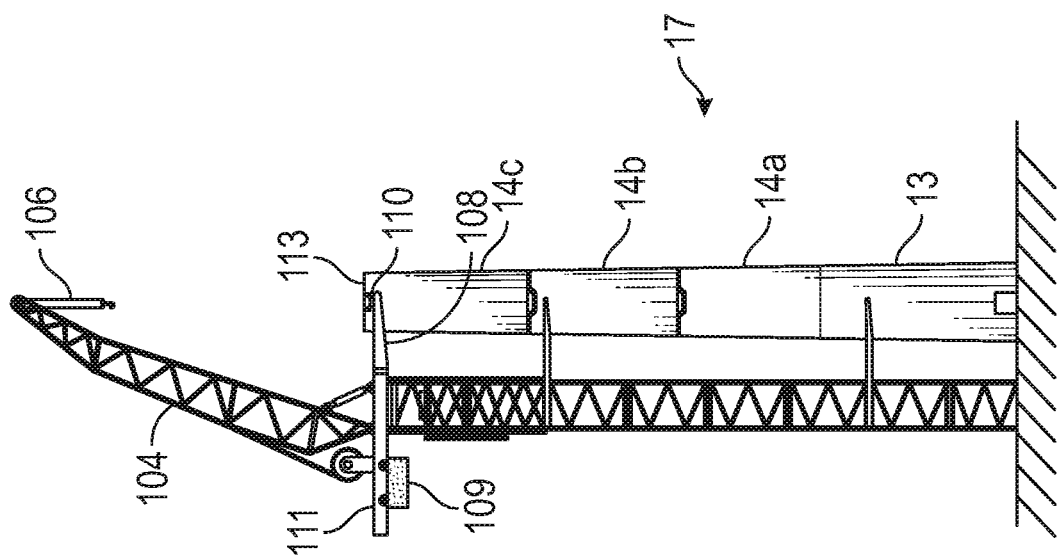

FIGS. 32-36 illustrate side views of a sequence of steps using the LS support member 108 to assemble a portion of the wind tower, according to one or more embodiments. In FIG. 32, a mobile crane can be used to erect the tower base 13 and tower sections 14a and 14b, as discussed herein. After the crane 100 is assembled to a height such that the LS support member 22 is adjacent to a hanger plate 113 of the upper most tower section, e.g., tower section 14b, the LS support member 108 can be coupled to the tower section 14b via tension cables 110. That is, tensions cables 110 can be coupled to the LS support member 108 and the hanger plate 114 of the upper-most tower section.

Figure 33:
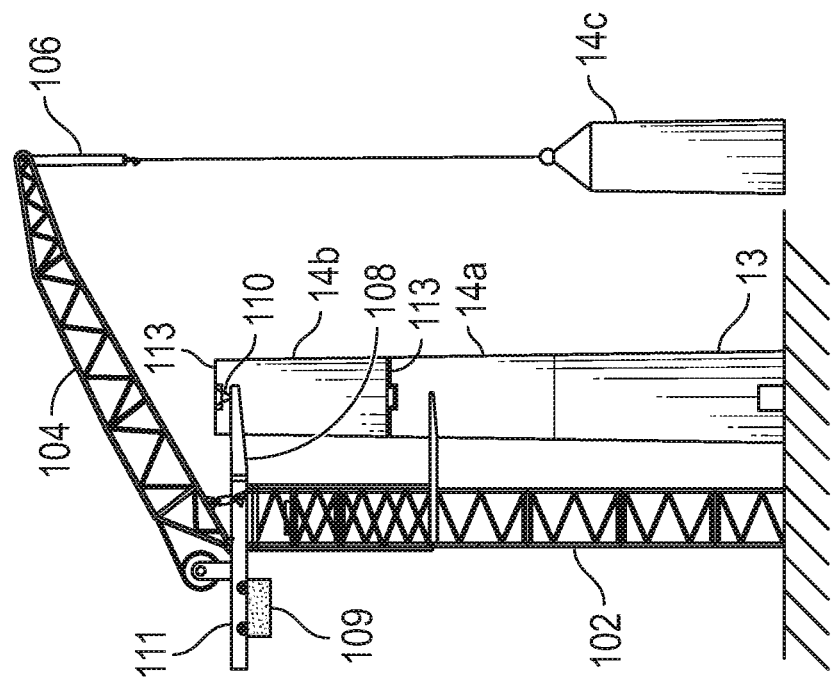
Figure 35:
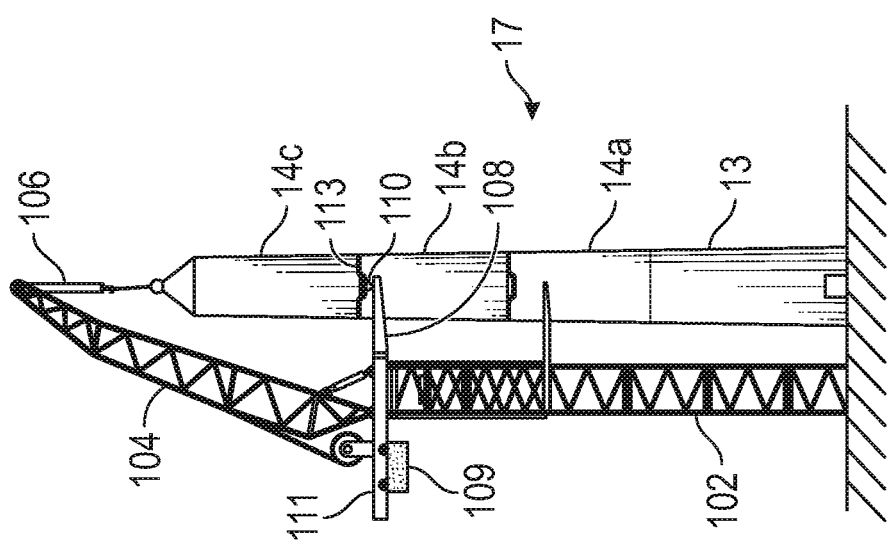
Figure 34:
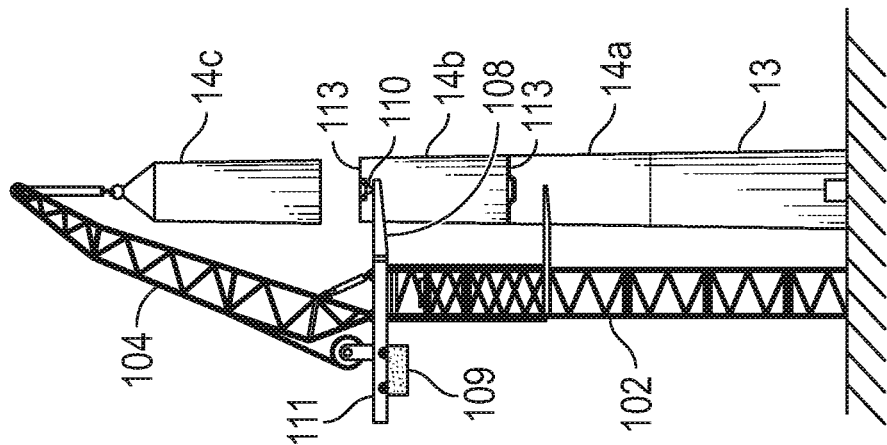

In FIG. 33, the jib 104 can be moved vertically to place the load cables 106 beyond the tower stack 17 and lowered to couple to the next tower section to be lifted, e.g., tower section 14c. Once the bottom of tower section 14c clears the top of tower section 14b, the jib 104 can be lifted vertically to place the bottom of tower section 14c above the top of tower section 14b, as shown in FIG. 34. Once aligned, the load cables 106 can loser tower section 14c onto tower section 14b, as shown in FIG. 35 Tower section 14c and tower section 14b can be coupled together. The tension cables 110 can be disconnected from the hanger plate 113 of tower section 14b. Once the LS support member 108 is uncoupled from the tower stack 17, the crane 100 can self-climb (e.g., by installing a tower section) such that the LS support member 108 is adjacent to the new upper-most tower section, i.e., tower section 14c. The LS support member 108 can is coupled to the hanger plate 113 of tower section 14c and the steps can be repeated to lift another tower section. This process can be repeated until the desired height of the tower stack 17 is achieved.

Figure 37:
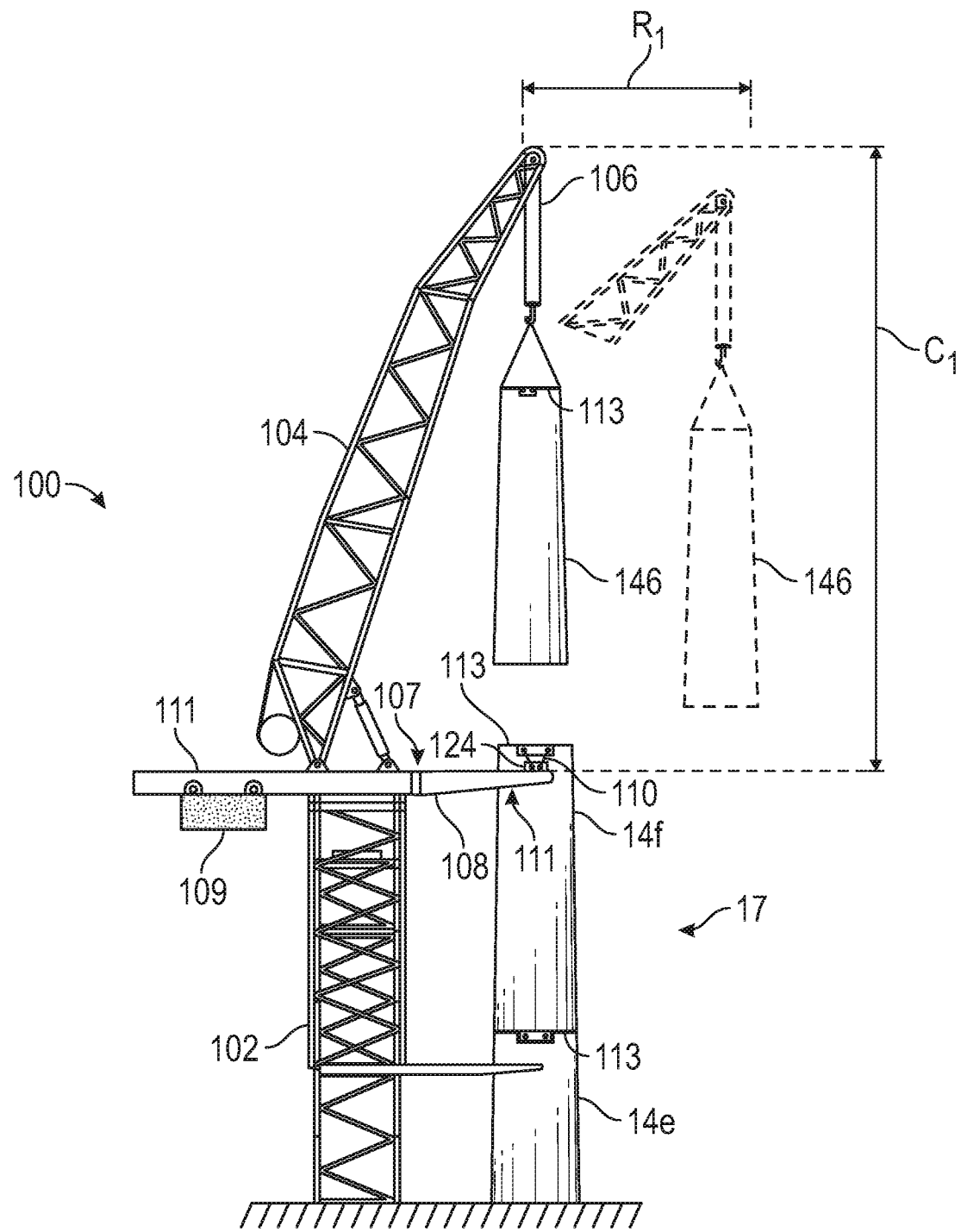
Figure 38:
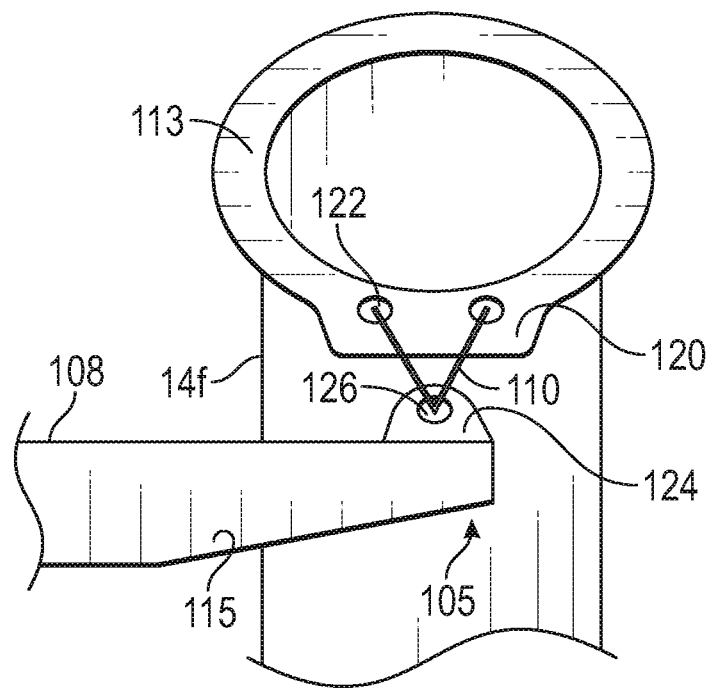
FIG. 38 is a close-up perspective view of the connection between the LS support member and a tower section, according to one or more embodiments.
Figure 39:
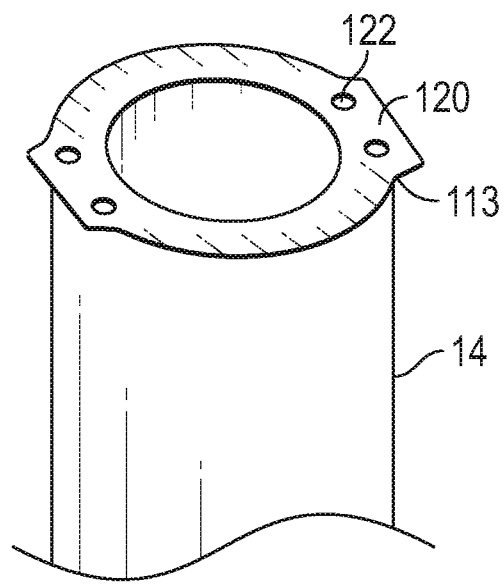
FIG. 39 is a perspective view of a tower section, according to one or more embodiments.

FIG. 37 illustrates a close-up side view of the LS support member 108, FIG. 38 illustrates a close-up view of the LS support member 108 coupled to the hanger plate 113 of tower section 14f, and FIG. 39 illustrates a portion of a tower section 14 including the hanger plate 113.

Referring to FIG. 37, the luffing crane 100 can have a maximum lifting range $R_1$ that is about 35 feet and a clearance $C_1$ between the LS support member 108 and the jib 104 when fully extended that is about 120 feet. In one example, the LS support member 108 can include two arms 115 (see FIGS. 40 and 41) extending from a first end 107 to a second end 105. The first end 107 is coupled to the crane 100 and the second end 105 is repeatably coupled to the upper-most tower section during assembly. Referring to FIG. 38, the hanger plate 113 includes two flanges 120 that are diametrically opposed. The flanges 120 include one or more openings 122 configured to be coupled to tension members 110.

Referring back to FIG. 38, the LS support member 108 can include a projection 124 extending vertically from the arm 115. The projection 124 can include one or more openings 122 that can be configured to receive a coupling mechanism of the tension members 110. As seen in FIG. 38, the tension members 110 couple to both the hanger plate 113 of a tower section 14 and the arm 115 of the LS support member 108.

Figure 40:
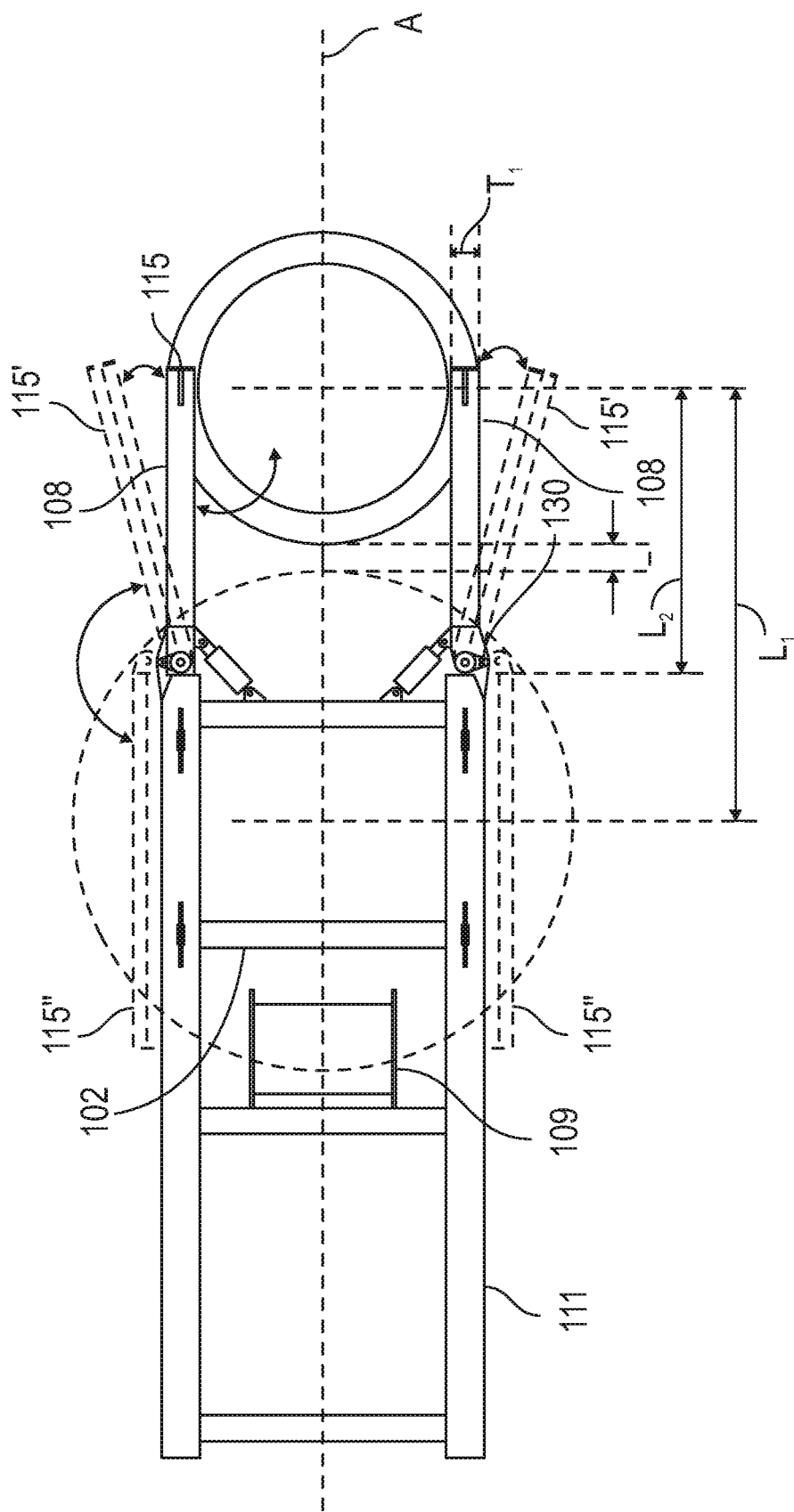
FIG. 40 is a top-down view of the LS support member, according to one or more embodiments.

FIG. 40 illustrates a top-down view of the LS support member 108. The LS support member 108 includes two adjustable arms 115. In one example, the thickness $T_1$ of the arms 115 is about 3 feet. As seem in FIG. 40, the arms are adjustable such that the arms 115 can move to accommodate different sized tower sections. An initial position of the arm 115 can be when they are parallel with the longitudinal axis A. The arms 115 can move toward the longitudinal axis A and the arms 115 can move away from the longitudinal axis A, shown as arms 115'. Further, the full range of the arms 115 can be such that the arms 115 can fully fold out and swing (shown as arms 115"), such that the arms can rest on a portion of the tower 102 of the crane 100. The folding back of the arms 115 allows the jig to rotate about the tower 102 without the LS support member 108 interfering with the tower stack. In one example, the LS support member 108 can include a coupling mechanism to couple the arms 115 to the tower 100 when the LS support member 108 is not in use or during rotation of the jig.

In one example, a length $L_1$ from the middle of the tower 102 to the point along the arms 115 that couple to the tower section when the arms are parallel with the longitudinal axis A, can be about 25 feet. Further, a length L2 of the arms 115 from the point of connection 130 to the tower 102 to the point of connection to the tower section (e.g., along projection 124) can be such that the crane 100 can rotate and have clearance with the tower stack.

Figure 41:
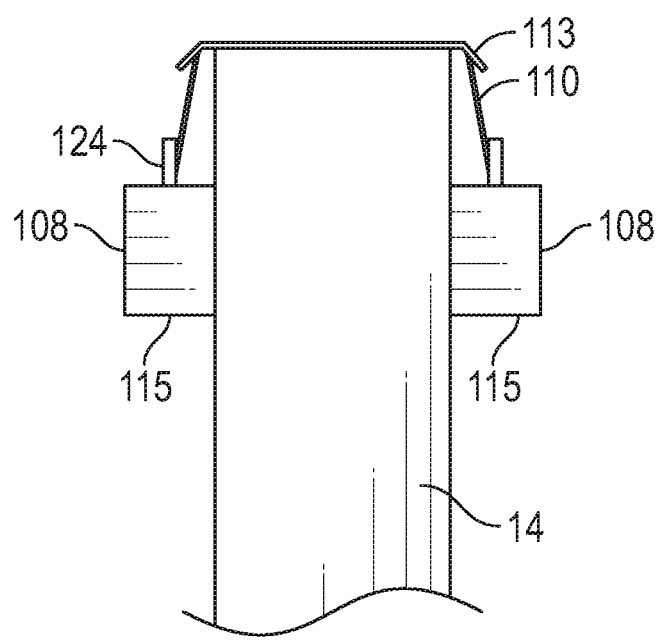
FIG. 41 is simplified front view of the LS support member attached to a tower section, according to one or more embodiments.

FIG. 41 illustrates a simplified front view of the LS support member 108 attached to a tower section 14. As seen in FIG. 41, the arms 115 couple to the tower section 14 by the tension members 110 extending from the hanger plate 113 of the tower section 14 to the projections 124 of the arms 115. By doing so, during lifting, a portion of the vertical load is transferred to the tower stack via the LS support member 108.

As discussed herein, the LS support members disclosed transfer a portion of the vertical load during lifting to the partially assembled tower stack. Thus, the LS support members as disclosed herein allows for smaller, less expensive tower cranes to be used for lifts that otherwise would require expensive tower cranes having a higher maximum lifting capacity. Further, the wind conditions that would otherwise require down time is minimized if lifting is done with the LS support member. That is, the wind conditions before down time is required can be reduced by systems using the LS support systems disclosed herein.

As will be appreciated, however, the tower erecting system is not limited to use for lifting tower sections and the nacelle, but is suited for lifting other types of equipment or components as well. Accordingly, the following description serves to illustrate the tower climbing system in the context of merely one example application.

In the foregoing description, various embodiments of the present disclosure have been presented to provide an illustration of the principals of the disclosure and their practical application, and to enable one of ordinary skill in the art to utilize the various embodiments, including with various modifications as are suited to the particular use contemplated. All such modifications and variations are within the scope of the present disclosure. The specific described embodiments are not intended to be exhaustive or to limit the invention to the precise form disclosed.

What is claimed is:

1. A method of assembling a wind tower, the method comprising:
   coupling a load-sharing (LS) support member to an upper-most tower section of a partially assembled tower stack of the wind tower, the LS support member extending from a first end to a second end, wherein the first end is coupled to a tower crane and the second end is coupled to the upper-most tower section of the partially assembled tower stack, wherein the LS support member is suspended from the upper-most tower section via tension members, wherein a first set of connection points between the LS support member and the tension members is below a second set of connection points between the upper-most tower section and the tension members; and
   lifting a subsequent tower section to be coupled to the partially assembled tower stack,
   wherein, during lifting, a portion of vertical load experienced by the tower crane during lifting is transferred to the partially assembled tower stack via the LS support member.

2. The method of claim 1, wherein the tower crane has a maximum capacity, wherein a first portion of the maximum capacity used during lifting with the LS support member is less than a second portion of the maximum capacity used during lifting the subsequent tower section without the LS support member.

3. The method of claim 1, wherein a maximum lifting capacity of the tower crane with the LS support member is greater than a maximum lifting capacity of the tower crane without the LS support member.

4. The method of claim 1, wherein the tension members are coupled to and extend between the LS support member and a hanger plate of the upper-most tower section.

5. The method of claim 1, further including:
   coupling the subsequent tower section to the partially assembled tower stack;
   increasing a height of the tower crane such that the second end of the LS support member is adjacent to a top end of the subsequent tower section.

6. The method of claim 5, further including:
   coupling the LS support member to the subsequent tower section.

7. The method of claim 1, wherein, once a desired height of a tower stack is achieved, the method further includes:
   lifting a nacelle to be coupled to the tower stack while the LS support member is coupled to the tower stack.

8. The method of claim 1, wherein the LS support member includes two vertical A-frame members extending from the first end to a second end, the second end defining a base frame.

9. The method of claim 8, wherein the base frame includes a plurality of stationary members and at least one moveable member that can move from a closed position to an open position.

10. The method of claim 1, wherein a maximum capacity of the LS support member is within a range of about 50 metric tons to about 500 metric tons.

11. A method of assembling a wind tower, the method comprising:
    coupling a load-sharing (LS) support member to a crane; and
    iteratively attaching a plurality of towers sections together to form a tower stack of the wind tower by repeatedly:
    coupling the LS support member to a first upper-most tower section of a partially assembled tower stack, wherein the LS support member is suspended from the first upper-most tower section via tension members, wherein a first set of connection points between the LS support member and the tension members is below a second set of connection points between the first upper-most tower section and the tension members;
    lifting a second tower section of the plurality of tower sections while the LS support member is coupled to the first tower section such that a portion of a vertical load experienced during lifting is transferred to the partially assembled tower stack via the LS support member;
    attaching the second tower section to the partially assembled tower stack to form a second upper-most tower section; and
    increasing a height of the tower such that the LS support member is adjacent to a top of the second upper-most tower section.

12. The method of claim 11, wherein a maximum capacity of the crane with the LS support member is greater than a maximum capacity of the crane without the LS support member.

13. The method of claim 11, wherein the LS support member extends from a first end to a second end, wherein the first end is coupled to the crane and the second end is coupled to the first upper-most tower section.

14. The method of claim 11, wherein, after the tower stack is formed, the method includes lifting a nacelle with the crane including the LS support member, the nacelle to be coupled to the tower stack.

15. The method of claim 11, wherein the crane is a mast-type crane, and wherein the coupling an LS support member to the crane includes coupling the LS support member to a boom of the mast-type crane.

16. The method of claim 11, wherein the crane is a luffing-jib crane, and wherein the coupling an LS support member to the crane includes coupling the LS support member to a top of a crane tower of the luffing-jib crane.

17. The method of claim 16, wherein the LS support member includes two arms extending laterally from the tower, the two arms extending from a first end, coupled to the crane tower, to a second end, the second end configured to couple to each upper-most tower section.

18. The method of claim 17, wherein the two arms are adjustable to accommodate various widths of tower sections.

19. The method of claim 11, wherein the LS support member includes two vertical A-frame members extending from a first end to a second end, the second end defining a base frame.

20. The method of claim 19, wherein the base frame includes a plurality of stationary members and at least one moveable member that can move from a closed position to an open position.

* * * * *